United States Patent
Whitehurst et al.

(10) Patent No.: US 6,830,603 B2
(45) Date of Patent: Dec. 14, 2004

(54) VOLATILITY-INHIBITED UREA FERTILIZERS

(75) Inventors: Garnett B. Whitehurst, New Bern, NC (US); Brooks M. Whitehurst, New Bern, NC (US)

(73) Assignee: Whitehurst Associates, Inc., New Bern, NC (US)

( * ) Notice: Subject to any disclaimer, the term of this patent is extended or adjusted under 35 U.S.C. 154(b) by 286 days.

(21) Appl. No.: 10/214,751

(22) Filed: Aug. 7, 2002

(65) Prior Publication Data

US 2004/0031303 A1 Feb. 19, 2004

(51) Int. Cl.$^7$ ................................................. C05C 9/00
(52) U.S. Cl. ......................................... 71/28; 71/64.02
(58) Field of Search ................... 71/28, 64.02

(56) References Cited

U.S. PATENT DOCUMENTS

| | | | |
|---|---|---|---|
| 3,353,949 A | 11/1967 | Nau | 71/64 |
| 3,388,989 A | 6/1968 | Sor | 71/28 |
| 3,423,199 A | 1/1969 | Philen, Jr. | 71/1 |
| 3,523,018 A | 8/1970 | Geissler | 71/28 |
| 3,523,019 A | 8/1970 | Philen, Jr. | 71/36 |
| 3,565,599 A | 2/1971 | Sor et al. | 71/28 |
| 4,332,609 A | 6/1982 | Ott | 71/27 |
| 4,462,819 A | 7/1984 | Van Der Puy et al. | 71/28 |

FOREIGN PATENT DOCUMENTS

| | | | |
|---|---|---|---|
| AU | 9645576 | | 9/1996 |
| GB | 483220 | * | 4/1938 |

OTHER PUBLICATIONS

M. A. Tabatabai, Effects of Trace Elements on Urease Acitivity in Soils, Soil Biol. Biochem, vol. 9, pp. 9 to 13, Pergamon Press, 1977, Great Britain.

Wolfgang Pietsch, Agglomeration Processes Wiley–VCH, 2002.

* cited by examiner

*Primary Examiner*—C. Sayala
(74) *Attorney, Agent, or Firm*—MacCord Mason PLLC

(57) ABSTRACT

Volatility-inhibited fertilizers are prepared by coating granular urea with a coating that includes a binding agent having a boron anion and a hydrogen bonding group to adhere the binding agent to the granular urea. The binding agent may be an amino alcohol borate in which the amino alcohol is selected from the group consisting of ethanolamine, diethanolamine, triethanolamine, and mixtures thereof, or a borate of an amino alcohol complex of a divalent metal. The borates are preferably prepared as an aqueous solution of the amino alcohol and boric acid, or the amino alcohol, a divalent metal salt, and boric acid, with the aqueous solution being applied to the urea granules. Additional plant nutrients may also be coated onto the urea granules.

23 Claims, 5 Drawing Sheets

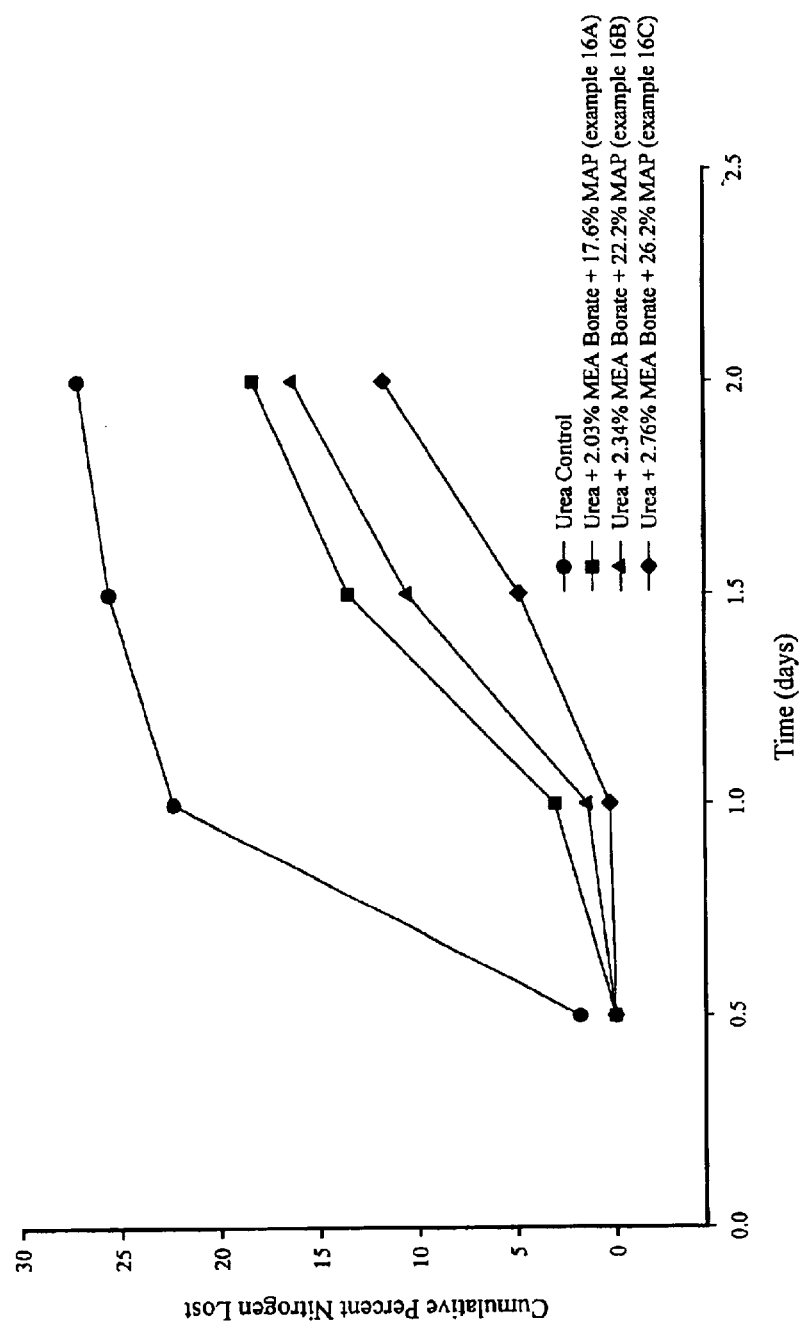

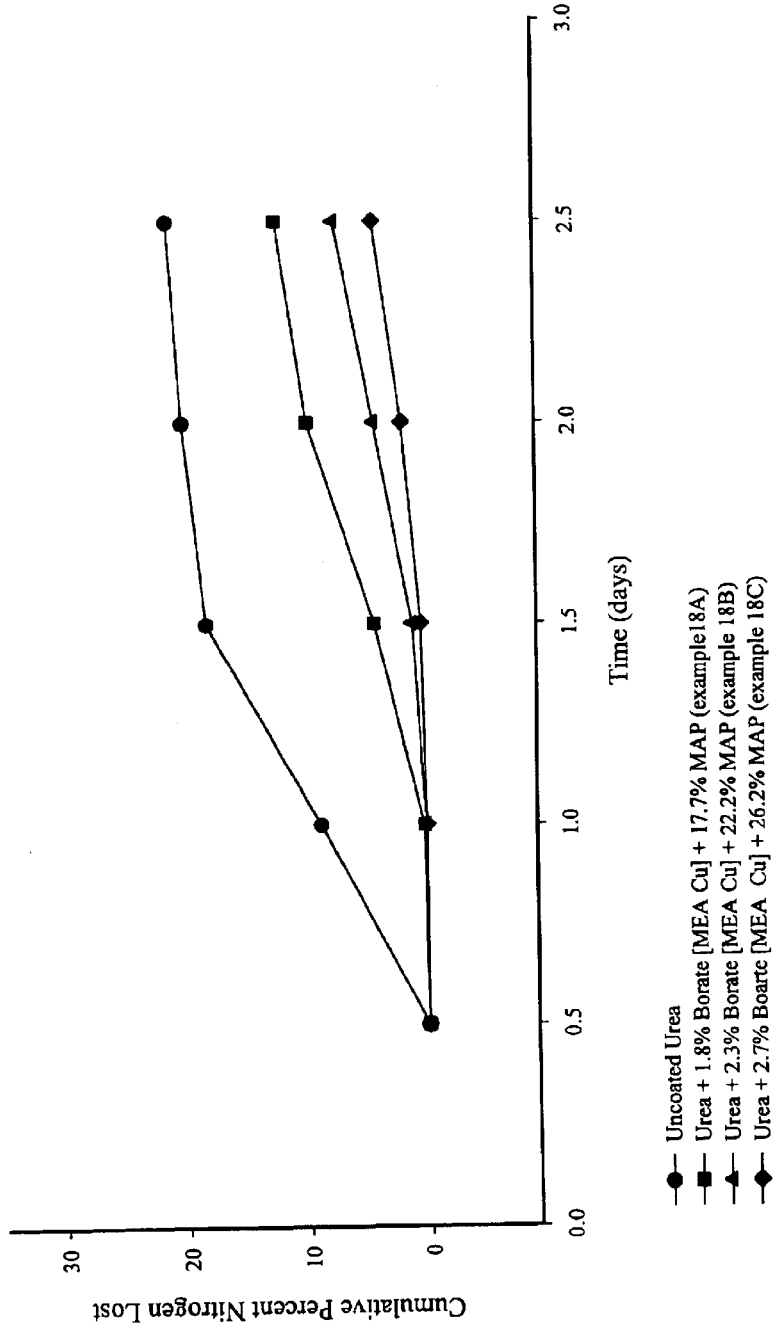

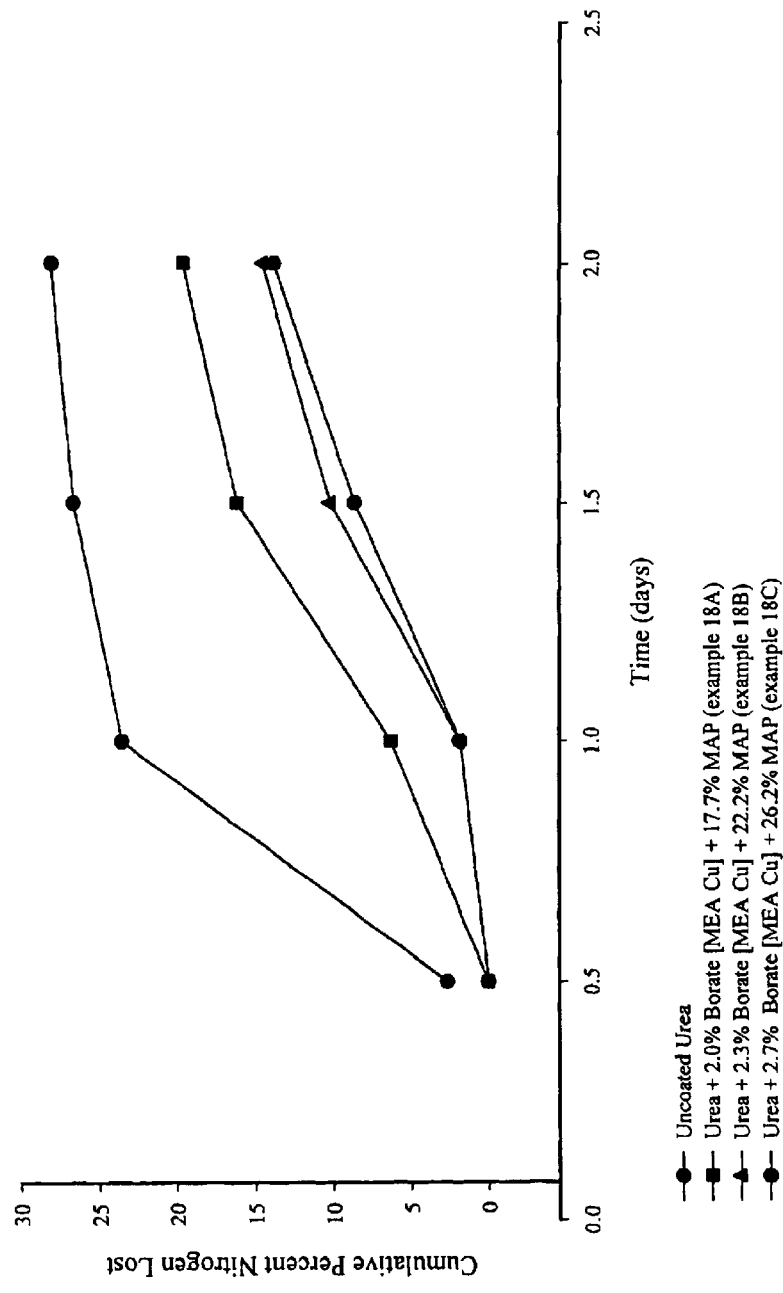

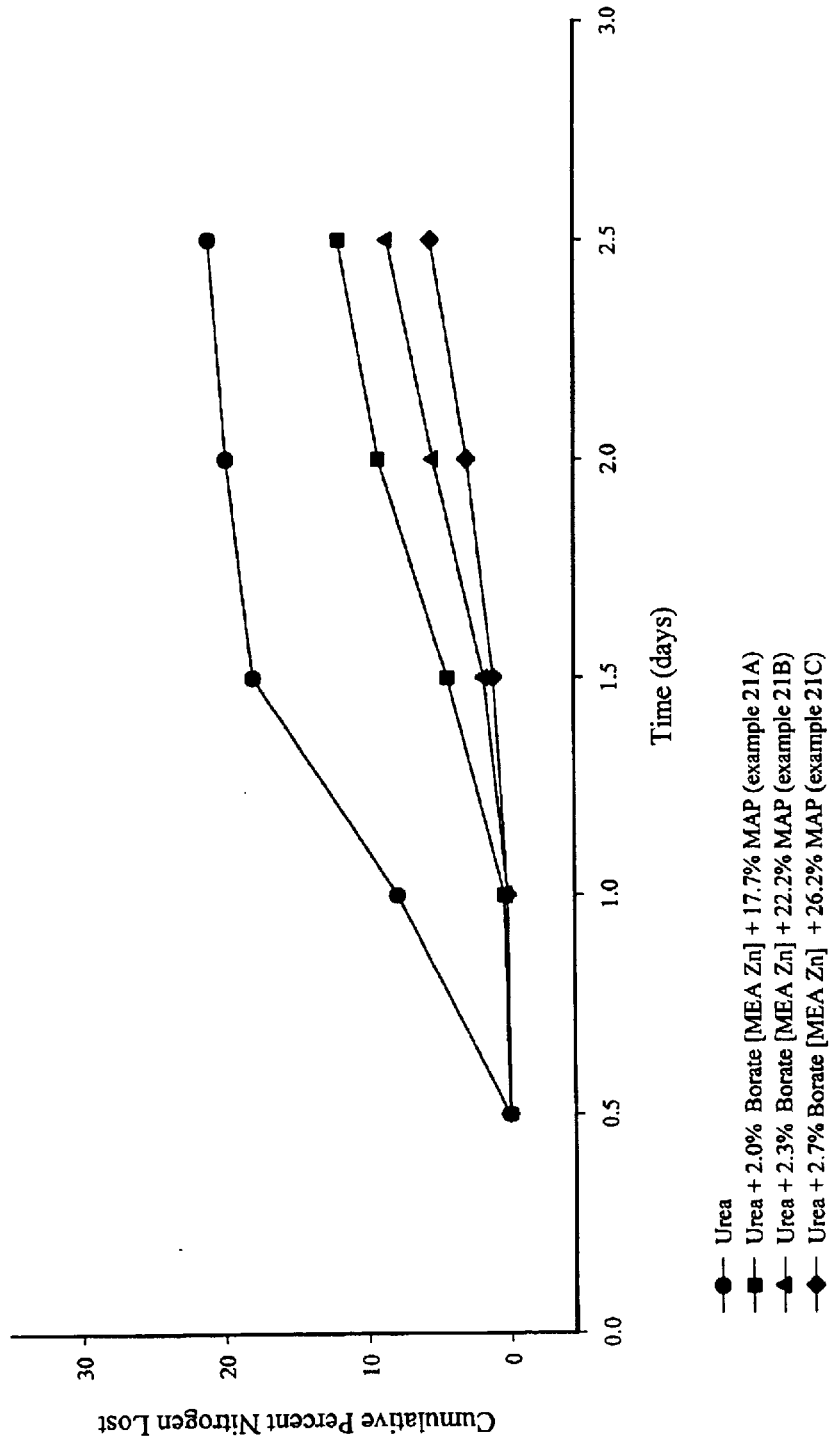

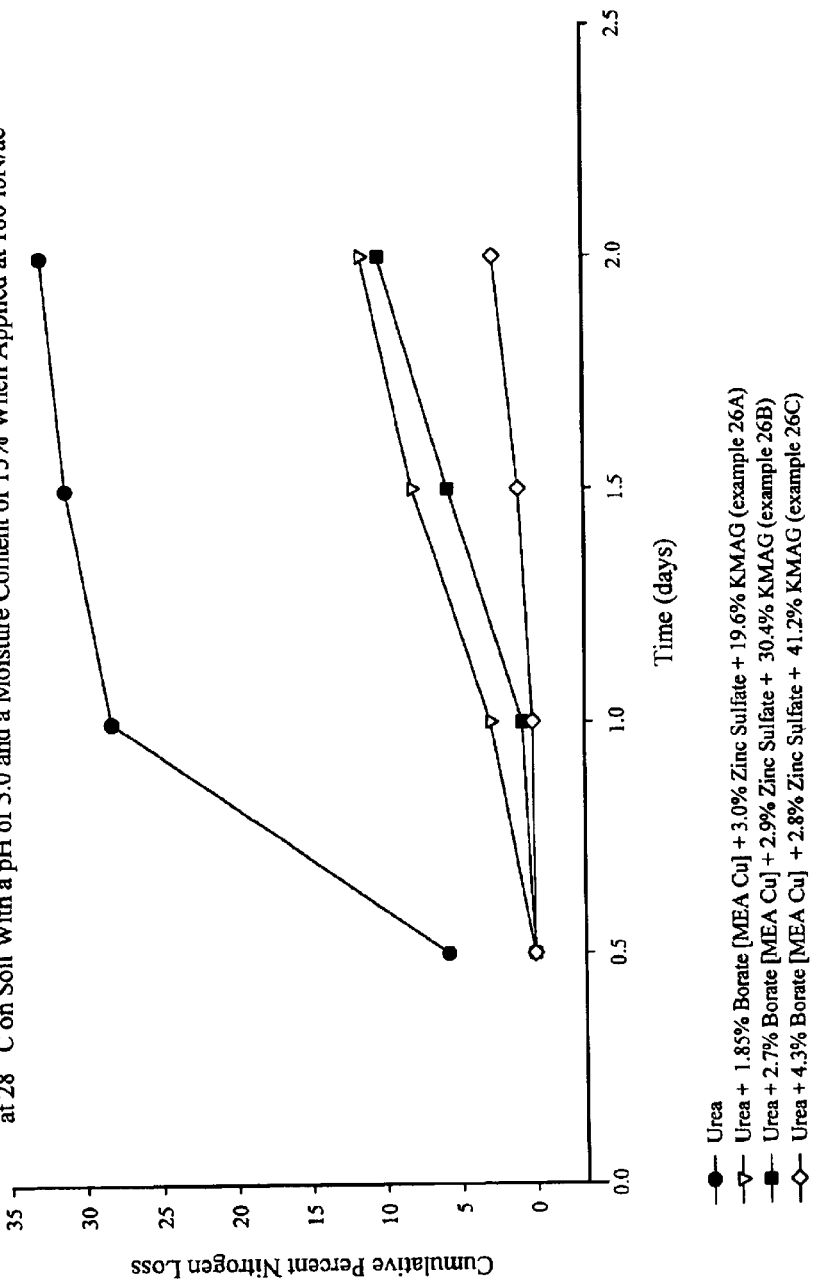

VOLATILITY-INHIBITED UREA FERTILIZERS

BACKGROUND OF THE INVENTION (1) Field of the Invention

The present invention relates to volatility-inhibited fertilizers comprised of granular urea coated with a coating including a binding agent having a boron anion and a hydrogen bonding group to adhere said binding agent to the granular urea, and optionally with additional plant nutrients, and to process for their preparation.

(2) Description of the Prior Art

Urea is widely employed as a non-burning nitrogen source for agricultural and forest fertilization. The granular form is commonly used for forest fertilization whereas granular and liquid forms may be used for agricultural fertilization. When applied to the soil, the granular form of urea dissolves by absorbing water and entering the soil solution. The water may come from rain or irrigation, atmospheric moisture and from water in the soil (soil moisture).

Once in the soil solution, urea is subject to hydrolysis by the enzyme urease. The hydrolysis reaction may ultimately produce ammonia as indicated in equation 1.

$$H_2NCONH_2 + H_2O \rightarrow 2NH_3 + CO_2 \quad (1)$$

The actual hydrolysis process proceeds through intermediates of ammonium carbamate and ammonium carbonate (see reviews by Terman "Volatilization Losses of Nitrogen as Ammonia From Surface Applied Fertilizers, Organic Amendments, and Crop Residues"—Adv. Agronomy 31:189–223, 1979 and Freney et. al.—"Volatilization of Ammonia" in *Gaseous Loss of Nitrogen from Plant Soil-Systems* Freney and Simpson editors, Martinus and Nijhoff, 1983). The volatilization problem with fertilizers has been the subject of much study and when urea is the fertilizer nitrogen source applied the governing factors are the ability of a given soil to release ammonia and the activity of the enzyme urease.

The loss of ammonia nitrogen from urea nitrogen is governed by the relationship between the ammonia/ammonium ion equilibrium and a number of soil variables. The soil variables include: temperature, soil pH, soil chemistry (cation exchange capacity and organic matter), and soil moisture. Increases in temperature favor ammonia release by increasing the base dissociation constant of ammonia and reducing the solubility of ammonia in the soil solution. An alkaline soil pH favors ammonia release by increasing the equilibrium percent of ammonia present in the soil solution. Soils with a high cation exchange capacity are better able to absorb ammonium ions reducing volatilization losses. Organic matter can absorb ammonia reducing losses as bacteria convert the ammonia to organic nitrogen. Applying urea or ammonia forming compounds to damp soils which are drying out due to wind or sunlight can increase ammonia losses.

The activity of the enzyme urease in a given soil is affected by temperature, soil pH, and the amount of enzyme present and dilution of the urea as it dissolves. Increases in temperature favor urea hydrolysis by increasing the activity of the enzyme urease. An alkaline soil pH also increases the activity of the enzyme urease. Organic matter is a significant source of the enzyme urease, which increases ammonia losses from urea. Urea applied under low moisture conditions takes longer to dissolve before hydrolysis can begin. Rainfall washes urea into the soil and dilutes the compound, which helps to reduce volatility losses.

Several methods have been used to reduce nitrogen losses from surface applied granular urea. Acidic coatings have been used to control the ammonia/ammonium ion equilibrium in the area where the particle dissolves. Urease inhibitors have been developed to reduce the activity of the enzyme urease, thus reducing volatile nitrogen losses. Finally, expensive, slow release urea compositions can be formed which extend the time needed to release the urea nitrogen.

As illustrative of acidic coatings, Young (U.S. Pat. No. 4,073,633; Feb. 14, 1978) teaches the use of an acid generating substance to keep the soil pH at 7 or less in the area where granular urea is applied. The acid generating substances include acids (inorganic and organic); salts such as ferric sulfate that are acidic in water; and compounds such as sulfur which are metabolized by soil microorganisms to acid compounds or form acidic oxidation products with oxygen. The products needed to exploit the invention can be made by coating urea granules or forming agglomerates of urea and the acid generating substances (e.g. the agglomerate indicated of urea, gypsum and an acid generating compound). The invention, also, indicates that clays such as kieselguhr in the range of 5% to 20% can be used to prevent sticking of coated products.

Whitehurst et. al. (U.S. Pat. No. 6,030,659; Feb. 29, 2000) teaches the formation of phosphate coatings on the surface of a urea granule by first reacting urea with an acid then allowing the acid surface to react with an insoluble phosphate mineral. The reaction with the insoluble phosphate mineral causes the formation of a soluble phosphate salt on the urea surface. The salts formed on the urea surface are typically acidic and help to reduce the volatile nitrogen losses.

Products having acidic coating materials are potentially corrosive to some metals used in fertilizer application equipment when damp. In addition, some micronutrients such as boron are unusable in aqueous acids due to low solubility—e.g. boric acid forms a suspension in phosphoric acid which is difficult to use to form coated products. In addition to the difficulty of handling the boric acid suspension, coated products produced with the suspensions can be sticky with poor flow characteristics.

A number of compounds are known to inhibit urease. Examples are the benzoquinones (Anderson GB 1,142,245; Feb. 5, 1969); dithiocarbamates (Tomlinson GB 1,094, 802—Dec. 13, 1967 and Hyson U.S. Pat. No. 3,073,694—Jan. 15, 1963); urea derivatives such as methylurea or thiourea (Sor et. al. U.S. Pat. No. 3,232,740; Feb. 1, 1966); phosphoric triamides (Kolc et. al. U.S. Pat. No. 4,530,714; Jul. 23, 1985); and organic bromine compounds and organic nitrates (Norden et. al. (U.S. Pat. No. 4,576,625; Mar. 18, 1986). Many of these compounds are expensive to use and some can be highly toxic.

In addition to the compounds identified above, metal ions and boron containing salts have been studied as urease inhibitors. Tabatabi (Soil Biology and Biochemistry 9:9–13, 1977) reported on the inhibition of soil urease by various metal ions and other compounds. All soils except one displayed less than 30% inhibition due to sodium tetraborate when used at a rate of 5 mole per gram soil. The exception was the Waller soil which had the lowest pH and lowest urease activity of the soils used in study.

Sor (U.S. Pat. No. 3,388,989; Jun. 18, 1968) discloses the formation of granules containing urea, a urease inhibitor and a hydrocarbon binder. The urease inhibitors revealed include soluble metal salts (Ag, Co, Cu, Hg, Mn, Mo, Pb), soluble borate salts, soluble metal fluorides and formaldehyde. The hydrocarbon binder includes waxes and asphalt. The urea, urease inhibitor and the heat softened hydrocarbon binder are mixed to form a granule. Sor indicates that it is desirable to heat all the ingredients when preparing the fertilizer mixture.

Sor et. al. (U.S. Pat. No. 3,565,599; Feb. 23, 1971) teaches the use of a urease inhibitor such as an alkali metal borate (sodium tetraborate) or boric acid in combination with a hydrophobic substance to reduce the nitrogen loss from urea fertilizers when applied to the soil. The boron source and the hydrophobic substance are preferentially distributed in the urea melt prior to prilling. The hydrophobic substances can include: waxes, vegetable oils, oleyl ether, polyethylene glycol, N-tallow trimethylene diamine, calcium petroleum sulfonate, naphthalene spray oils, octadecylamine and dimethylpolysioxane. The patent, also, claims a coating of octadecyl amine and sodium tetraborate coated unto urea.

Geissler (U.S. Pat. No. 3,523,018; Aug. 4, 1970) discloses the formation of urea granules containing urease inhibitors. The granules are formed by incorporating the inhibitor into the urea melt prior to prilling. The inhibitors claimed include: copper formate, copper acetate, aliphatic amines, boron trifluoride, alkyldithiocarbamates, hydroxylamine and a mixture of borax and copper sulfate. The patent discloses a number of other inhibitors that include: copper sulfate, borax, boric acid, EDTA copper complexes, copper tetrafluoroborate, and metal ions such as Cu, Co, Mn, Zn, fluorides, bromides and cyanides.

Van der Puy et. al. (U.S. Pat. No. 4,462,819; Jul. 31, 1984) discloses a number of urease inhibitors involving organic boron compounds. The basic general structure $R_1R_2BOH$ where there is at least 1 carbon—boron bond. If there are two OH groups attached to the boron atom, then the carbon—boron bond will be to a substituted aromatic ring system.

The literature referenced above indicates that considerable interest exists for the development of compositions, which are able to inhibit urease. Some materials identified as inhibitors could not be used for fertilizers (Pb, Hg etc.) due to plant toxicity and other environmental issues. Some are too expensive for routine use. Some require special solvents for dispersion onto granular urea.

The process of coating a fertilizer particle with other materials using a binder is well known and can be viewed as a special case of agglomeration technologies which have been reviewed by Pietsch (See Wolfgang Pietsch—*Agglomeration Processes Phenomena, Technologies, Equipment*—Wiley VCH 2002 particularly pages 35–46; 151–187; 415–440).

Successful agglomeration (and/or coating) requires a suitable binding agent to hold the other powdered materials on the surface or to bind the agglomerate together when a low pressure method is used.

DiCicco (U.S. Pat. No. 3,560,192; Feb. 2, 1971) deals with the coating of granular fertilizers with micronutrients using an aqueous zinc chloride solution as a binder. The micronutrients must be in powdered form (less than 149 m). The fertilizer materials indicated are diammonium phosphate, ammonium nitrate, granular triple super phosphate and potassium chloride or mixture of these fertilizer materials.

Hall (U.S. Pat. No. 1,977,628; Oct. 23, 1934) discloses two methods for preparation of urea fertilizers containing other fertilizer materials. In the first method a water insoluble ballast material is added to a urea melt. The water insoluble ballast includes: rock phosphate, chalk, gypsum (calcium sulfate dihydrate). The melt may also contain potassium salts or ammonium phosphates. In the second method, the desired fertilizer materials in finely divided form are mixed together then coagulated into a granule. The coagulation process requires water or steam.

Miller (U.S. Pat. No. 3,961,932; Jun. 8, 1976) describes the coating of fertilizers with chelated micronutrients is described. The chelating agents described are mostly aminopolycarboxylates (EDTA family). The fertilizer to be treated is sprayed with a solution containing the chelated metal complex (1%–5% typically). The coating process is finished by adding a drying agent such as calcium silicate or silica. The drying agent must be in finely divided form.

Nau (U.S. Pat. No. 3,353,949; Nov. 21, 1967) teaches the formation of granular fertilizers containing micronutrients. The granular products are formed by mixing a substrate fertilizer particle (larger than 841 $\mu$m in size) with the desired powdered micronutrients (less than 149 $\mu$m in size) then adding a water-soluble conditioning agent. The conditioning agent is a 30% to 70% aqueous solution of sugars (glucose, dextrose, and molasses), alkali metal lignin sulfonates, or water-soluble fertilizers (ammonium nitrate or urea). In an alternate method indicated by Nau, the base fertilizer can be mixed with the conditioning agent then mixed with the powdered micronutrients.

Philen et. al. (U.S. Pat. No. 3,423,199; Jan 21, 1969) describes the coating of a fertilizer with pulverized micronutrients (Zn, Cu, Fe, Mn, Co, B, Mg, Mo, S, and mixtures). An in-situ macronutrient solution is formed on the surface of an existing fertilizer particle with water or steam. To the wetted surface powdered micronutrients are added. In a related patent Philen et. al. (U.S. Pat. No. 3,523,019; Aug. 4, 1970) discloses the use of an ammonium polyphosphate solution as a a binder.

Walter et. al. (AU 9645576; Sep. 5, 1996) teaches the formation of micronutrient coated urea products by the agglomeration of urea, the desired micronutrient using a coating additive to cause the micronutrients to stick to the urea. The coating process for urea involves the tumbling of urea with minute traces of water and particulate micronutrients or secondary nutrients or coating additives, which assist in binding the desired, other nutrients.

Detroit (U.S. Pat. No. 5,041,153; Aug. 20, 1991) teach es the use of lignin sulfonate salts to control caking and dusting in various fertilizers. The fertilizers covered are ammonium phosphates, calcium phosphates, sulfates, nitrates, and potassium chloride.

Buchholz (CA 1,337,460; Sep. 29, 1989) teaches the use of an a queous solution containing urea and lignin sulfonate to reduce tendency for dust formation of granular fertilizers. The urea-lignin sulfonate mixture is intended to cause small particles present to adhere to the larger particles present.

The need for conditioning agents for some fertilizers is well known. Sawyer et. al. (U.S. Pat. No. 3,234,003; Feb. 8, 1966) discloses the coating of fertilizer particles (high nitrogen content) with diatomaceous earth, various clays and limestone to prevent caking. The invention of Sawyer et. al. describes an additional conditioning agent composed of kaolin clay coated with an aliphatic amine (8–22 carbons) and a solvent for the amine consisting of a fatty nitrile (12–20 carbons) and a hydrocarbon oil. The patent then describes the use of the conditioning agent to treat hygroscopic fertilizer granules.

Van Hijfte et. al. (U.S. Pat. No. 4,500,336; Feb. 19, 1985) indicates that a composition composed of urea granules and super phosphate granules (single or triple) form a deliquescent mixture and describes the substitution reaction between urea and a super phosphate that results in the release of hydration water of the super phosphate. The invention describes the use of a crystallization inhibitor (aluminum salts) to prevent the reaction of urea with super phosphates.

Barry et. al. (U.S. Ser. No. 3,425,819; Feb. 4, 1969) describe the production of urea containing granules by spraying a bed of granular urea and recycled fines with a aqueous slurry of mono- and diammonium phosphates. The product granules are dried at temperatures from 140° F. to 200° F. Compositions which contain significant amount of DAP combined with urea will not provide volatility reductions due to the alkalinity of DAP.

Whitaker et. al. (U.S. Pat. No. 2,074,880) describes a molecular addition compound of urea and calcium sulfate prepared from urea and gypsum.

Young (U.S. Pat. No. 4,701,555; Oct. 20, 1997) describes a method for removing biuret from urea fertilizers which have been heated to 130° C. or higher during manufacturing of the urea granules. Young indicates that biuret is a material toxic to plants.

SUMMARY OF THE INVENTION

The present invention relates to compositions to reduce volatilization losses from granular urea when used as a soil applied fertilizer, and in particular to granular urea coated with amino alcohol borates (borate and polyborate mixtures), resulting in coated urea products having reduced volatile nitrogen losses when applied to soils. In addition, it has been found that coated urea products prepared from aqueous solutions of borates containing complex ions of some divalent metals with amino alcohols (alkanolamines) will reduce volatile nitrogen losses when applied to soils. Numerous coated urea compositions can be made using the volatility inhibiting aqueous borate solutions allowing compositions to be altered to meet site specific requirements to control volatility losses from the included urea and to provide needed additional macronutrients (nitrogen, phosphorus, potassium, calcium, magnesium, and sulfur) and/or micronutrients (boron, chlorine, copper, iron, manganese, molybdenum, nickel, and zinc) required on some soils. The terms macronutrient and micronutrient follow the classification scheme of Marschner (Marschner, Horst—Mineral Nutrition of Higher Plants $2^{nd}$ edition Academic Press, 1995). In addition to coating of urea to reduce nitrogen losses, the volatility inhibiting aqueous compositions can be used for dust control purposes when formulating products from granular fertilizer substrates.

The invention relates to processes for preparing coated granular fertilizer products containing urea as the primary nitrogen source in which the volatility or tendency to release nitrogen as ammonia is reduced. It has been discovered that an aqueous borate solution prepared by the neutralization of boric acid with an amino alcohol such as ethanolamine or triethanolamine will reduce the nitrogen loss from soil applied urea when the borate solution is coated onto the surface of granular urea. In a related discovery, it has been found that an aqueous borate solution containing complex ions of a divalent metal such as copper or zinc with ethanolamine can be used to prepare coated urea products with reduced nitrogen losses. The two volatility inhibiting borate mixtures (amino alcohol borate solution, and borate solution containing complex ions of a divalent metal with ethanolamine) can be used to build a number of useful fertilizer compositions that exploit the ability of these compounds to reduce nitrogen losses from soil applied fertilizer materials subject to volatilization.

The volatility reduced urea containing product compositions are prepared from an existing urea granule, a volatility inhibiting aqueous borate solution and if desired other macronutrients and/or micronutrients in the form of fine powders. When other plant nutrients (macronutrients and/or micronutrients) are used to prepare coated urea fertilizer products then the borate solution acts as both a volatility inhibiting agent and a binding agent to hold the additional nutrients onto the granular urea surface. Fertilizer compositions can be built from granular urea that will satisfy specific site requirements with the benefit that nitrogen losses from transformation of urea into ammonia are reduced by the volatility inhibiting borate solution binding agent. The compositions can be used to reduce the nitrogen losses on soils having different pH values making it possible to target compositions for different soil pH values.

Granular urea (46-0-0) is a commercially available product used as the base substrate for building the fertilizer products of the invention. The preferred granular urea has a particle size greater than 2 mm.

The aqueous volatility inhibiting borate solution required to practice the invention can be one of several compositions. The simplest volatility inhibiting borate compositions are prepared by dissolving an amino alcohol such as ethanolamine or triethanolamine in water and then adding boric acid to the aqueous amino alcohol solution. For these aqueous volatility inhibiting mixtures the molar ratio of boric acid to amino alcohol should be above 2.5:1. The best volatility inhibition is obtained when volatility inhibiting borate solution contains above 5% boron and has a final solution pH below 8. When ethanolamine is used a molar ratio of boric acid to ethanolamine of 4.1:1 will permit a borate solution to be prepared which contains 6.2% B with a pH below 8. When triethanolamine is used a 6.2% B solution can be prepared with a molar ratio of 2.8:1, which has a pH below 8. The volatility inhibiting ability of the solution is related to the boron content and higher boron contents are needed on higher pH soils.

A borate salt is formed from the volatility inhibiting solution when water is removed from the volatility inhibiting solution. Thus, when the borate solution is used to coat urea and the water is subsequently removed a borate salt is present on the urea surface. If ethanolamine was reacted with boric acid and the water is removed, ethanolamine borate can be obtained. Because of the well known tendency of borates to polymerize in aqueous solution to form polyborates, the borate salt may include some polyborate salts of ethanolamine. Likewise diethanolamine and triethanolamine would yield diethanolamine borate (polyborate) or triethanolamine borate (polyborate). Since it may be difficult to determine which polyborates are present in the volatility inhibiting solutions the salts which form will be described as amino alcohol borates (e.g. ethanolamine borate) and the urea surface will be considered as coated with a mixture of amino alcohol borates.

A second group of volatility inhibiting borate solutions can be prepared from the solution which contains complex ions formed by reaction of ethanolamine with divalent metal. The term complex ion refers to a polyatomic ion formed when a metal ion in solution reacts with a Lewis base (ligand) and 1 or more coordinate covalent bonds form between the metal ion and the ligand. Within the context of this invention, the ligand molecule is an amino alcohol such as ethanolamine. A single ligand molecule may form multiple complex ion structures with the same metal, thus it is possible to have more than one complex ion of a metal ion and a ligand present together.

The complex ion believed to be present in the borate solutions of the invention are those formed by reaction of 4 moles of ethanolamine and 1 mole of the metal ion (copper (II) or zinc). The resulting complex ions have formulas of $[Cu(C_2H_7ON)_4]^{2+}$ or $[Zn(C_2H_7ON)_4]^{2+}$, here $C_2H_7ON$ is the molecular formula for ethanolamine. The aqueous anions which are present in the solution include the anion of the metal salt used and borate anions (polyborate anions).

More than one complex ion involving copper (II) or zinc and ethanolamine may be present in the borate containing aqueous mixtures of the invention although it is believed that the initial complex ion prepared involves four moles of ethanolamine and the metal ion. Thus, the terminology borate solution of complex ions of copper (II) or zinc will be used when referring to these solutions. The abbreviation borate [MEA Cu] or borate [EA Cu] will be used when needed to refer to a borate solution that contains complex ions formed by reaction of ethanolamine and copper (II). The abbreviation borate [MEA Zn] or borate [EA Zn] will be used when needed to refer a borate solution that contains complex ions formed by reaction of ethanolamine and zinc. In addition, the boron and copper (II) or zinc contents of the solutions will be stated.

To prepare the borate solutions containing the complex ions of copper (II) or zinc a water soluble salt of copper or zinc is first dissolved in water and then ethanolamine is added to form the complex ion. Any soluble salt of copper (II) or zinc such as an acetates, chlorides, nitrates or sulfates could be used for preparing the solutions. Acetates, chlorides or sulfates are more desirable due to potential reactions of the nitrate ion with organic substances. An excess of ethanolamine to metal ion is required. A molar ratio of ethanolamine to copper (II) of at least 8:1 (preferably 10:1 or higher) is needed to ensure stability when boric acid is added to the aqueous solution of the complex ion of copper (II) and ethanolamine. A molar ratio of ethanolamine to zinc of 10:1 preferably 12:1 or higher) is needed to ensure stability when boric acid is added to the aqueous solution of the complex ion of zinc and ethanolamine. Heat is liberated when the ethanolamine is added to aqueous metal ion solution and the pH of the solution increases. Hydroxides which form are typically dissolved by ethanolamine and the final pH is typically alkaline (above 8.5). The excess of ethanolamine is needed to ensure that an acceptable molar ratio of unbound amine to boric acid is present when boric acid is added to the solution.

To complete the preparation of the volatility inhibiting borate solution containing the complex ions of copper (II) or zinc with ethanolamine, boric acid is added. The maximum boron content is near 6.5%. The maximum copper (II) or zinc content depends upon the boron content of the mixture and at a boron concentration of 6.2% a borate solution containing 2% copper (II) or zinc is possible from the sulfate salt of each metal. A stable solution containing 5.4% B and 4.6% Cu is possible using copper (II) chloride. Preferably the borate solution containing the ethanolamine metal complexions will have at least 6% B and least 1% of the metal ion. The volatility inhibiting ability of the borate solutions containing the complex ions of ethanolamine with copper (II) tends to increase as the copper (II) content increases if the boron content is constant. The volatility inhibiting borate solutions containing complex ions of zinc with ethanol amine are slightly more effective on higher pH soils than the borate solution containing the complex ions of copper (II) with ethanolamine.

When water is removed from the volatility inhibiting borate solution containing complex ions of a divalent metal with ethanolamine, then a salt containing the complex ion will be present. For example, if copper (II) sulfate is used in preparation of the complex ion containing solution and then water is removed the salt would have the formula [Cu $(C_2H_7ON)_4]SO_4$ where $C_2H_7ON$ is the molecular formula for ethanolamine. The [] in the formula was included to indicate that the complex ion structure remains. Because the volatility inhibiting solutions have borate anions present the complex ion salts formed when water is removed could include borates or polyborates. When the borate solution containing the complex ions is used to coat urea and water is removed then the surface of the urea will have a mixture of borate salts and other complex ion salts of the divalent metal used. Thus, the urea surface will be considered as coated with a mixture of borate salts and complex ion containing salts.

Borate solutions have a well known tendency to crystallize at low temperatures. Ethylene glycol can be added to both lower the crystallization point and lower the solution pH. Sorbitol will lower the solution pH but will not protect zinc containing mixtures from precipitation when frozen. Copper containing mixtures that contain sorbitol will freeze; however, the mixtures will dissolve when thawed. Adding chelating agents such as citric acid or glucoheptonates will help to stabilize the zinc containing mixtures; however, they appear to counteract the volatility inhibiting ability of the solutions.

Coated urea products of the invention without added macronutrients and/or micronutrients can be formed from the volatility inhibiting borate solution and granular urea. Granular urea is mixed with a desired quantity of the volatility inhibiting borate solution and the wetted granules are allowed to dry until a free flowing product is obtained. The length of drying time depends upon the amount of volatility inhibiting borate solution used to wet the urea granule surface.

To shorten the production time, the wetted urea granules may be dried by well known drying techniques. These techniques can be used provided the temperature of the urea granule wetted with the volatility inhibiting borate solution remains below the melting point of urea (132° C.). Preferably, the temperature should be less than 70° C. to prevent the formation of phytotoxic biuret.

An alternate approach to obtaining a free flowing granular product from the urea granules wetted with the volatility inhibitor borate solution involves forming a dry surface coating using a flowability aid. Methods for forming the solid coating are described in the sections which follow. The materials which can be used as flowability aids include clays, insoluble phosphate containing minerals and silica and gypsum. The only requirement for forming the coating is that material selected be in the form of a fine powder. Clays have widely been used in the fertilizer industry to improve flowability of products which may contain moisture or hygroscopic products and would be preferred for this purpose due to their low cost.

Coated urea products of the invention which contain macronutrients and/or micronutrients are prepared from granular urea, the volatility inhibiting borate solution (amino alcohol borate or borates containing complex ions of copper (II) or zinc with ethanolamine), and a source of the additional plant nutrients in the form of fine powders. The term fine powder is used to indicate a solid material of which at least 90% will pass through an opening of 149 μm. The volatility inhibiting borate solution acts as both a volatility inhibitor and a binding agent to hold the additional nutrients to the surface of the urea granule. If the additional nutrient material cannot be obtained commercially in the form of a fine powder then it must be pulverized to meet the particle size specification. Equipment is commercially available which is capable of pulverizing the oversize raw material including hammer mills, pin mills, roller mills, etc.

The additional macronutrient sources available for forming the surface coating upon the urea granule with the volatility inhibiting borate binder solution are commercially available phosphate or sulfate salts and mixtures of the same. For example, the monovalent phosphates such as ammonium dihydrogen phosphate (MAP) and potassium dihydrogen phosphate can be used to prepare a phosphate coated urea. In the case of commercially available fertilizer grade MAP, a solution (5% w/v) formed when the MAP is added to water should be less than 5. In addition to the phosphate salts indicated, calcium dihydrogen phosphate (triple superphosphate, TSP) may be used in combination with MAP, however, it will from a wet mass when used alone. When MAP and TSP are used together to form the phosphate coating, the weight ratio of MAP to TSP should be 4:1 or higher. Exemplary sulfate salts that may be used to supply one or more of the additional nutrients for the surface coating include gypsum (calcium sulfate dihydrate), potassium sulfate and potassium magnesium sulfate (sulfate of potash and magnesia—langbeinite—$K_2SO_4.2\ MgSO_4$; $MgSO_4\ K_2SO_4.6H_2O$). Epsom salts ($MgSO4.7H_2O$) forms a wet mass when combined with urea and is unusable in the invention. It is possible to form mixtures of the sulfate salts and a monovalent phosphate salts to form a urea particle coated with additional nutrients containing sulfur and phosphorus in addition to the cation present in either the sulfate or phosphate salts. Ammonium sulfate may be used to supply sulfur as well as additional nitrogen provided the pH of the volatility inhibiting borate binder solution is adjusted to less than 7. Wettable sulfur powder may be used to provide sulfur singly or in combination with other phosphate or sulfate salts.

The micronutrient sources available include the sulfate, nitrate, chloride or acetate salts of copper, iron, manganese and zinc. Mixtures of the indicated salts may be used to supply more than one micronutrient. Boron (in excess that present in the volatility inhibiting borate binder solution) may be added as boric acid (preferred) or a soluble borate salt (ammonium, potassium or ammonium) such as sodium borate (including the metaborates and polyborates and their hydrated forms).

The micronutrient molybdenum is generally required in such small quantities that it can be mixed with the volatility inhibiting borate binder solution to ensure a uniform distribution of the molybdenum. Ammonium, potassium or sodium molybdate are acceptable sources of molybdenum.

The coating step of the invention using urea, a volatility inhibiting borate solution and the additional nutrients previously indicated may be accomplished in more than one manner.

In the first method, granular urea is wetted with the volatility inhibiting borate binder solution by mixing the two materials until the urea granule surface appears damp. The two materials may be mixed in any type of mixing equipment a nd the time required will vary depending upon the type of mixer used; however, the times are usually less than 3 minutes. The final product comprising urea, the volatility inhibiting borate solution and additional nutrients is formed by adding the additional nutrients in the form of fine powders to the urea wetted with the volatility inhibiting borate binder. If more than one additional nutrient source is to be added then powders must be premixed before adding them to the urea granules wetted with the volatility inhibitor borate binder. The mixture of urea wetted with the volatility inhibiting borate binder and additional nutrients is then mixed until a free flowing product is obtained. When mixing is continued too long, the surface coating may be transferred between product granules leaving some product granules with little or no coating. If the mixing time is too short, the powder will not be distributed evenly and the product will have a grainy appearance. Typically, the mixing times after addition of the powders are less than 6 minutes.

A planetary mixer typically used for bread making is very suitable for preparing laboratory size samples. This mixing equipment allows compositions to be quickly evaluated for incompatibility. For larger samples, a tumbling mixer such as that used for preparing mortar mixes or concrete mixing in small batches is suitable. For commercial quantities, equipment used in the fertilizer or pharmaceutical industry for tumble growth agglomeration and coating were found to be suitable for making the products containing urea, volatility inhibiting borate solutions and additional nutrients.

To properly prepare the products composed of urea, volatility inhibiting borate binding solutions and additional nutrients, care must be taken to ensure a proper ratio of urea/binding solution and additional nutrients. It is well known in coating or tumble growth agglomeration, that when too much binding agent is used the products will be wet and have little strength. If too little binding agent is used the resulting products may contain dust. Typically a weight ratio of dry fine powder supplying additional nutrients to volatility inhibiting borate binding solution in the range of 8:1 to 12:1 will give satisfactory products.

The alternate approach to forming the coated urea products from urea, a volatility inhibiting borate binding solution and additional nutrients involves first forming a mixture of dry ingredients then spraying the volatility inhibiting borate solution binding agent into the dry mixture to cause the particles to agglomerate. The volatility inhibiting borate binder solution is added in the form of a spray or mist to cause the fine powders containing desired macronutrients and/or micronutrients to adhere to the surface of the urea granule. Any spraying equipment producing droplets of the volatility inhibiting borate binder solution will be satisfactory.

Any mixing equipment that produces a tumbling bed or mechanically fluidized bed of the mixture of urea granules and desired fine powders of additional nutrients will be satisfactory. The rotating drum mixers are typically used in the fertilizer industry for granulation of fertilizer products and work by producing a tumbling bed of particles. The rotating drum mixers are better for continuous production of product, which is the preferred method of practicing the coating of urea with additional nutrients of the invention. In the continuous process, the urea granules and fine powders are introduced at one end of the mixer and as the bed tumbles the volatility inhibiting borate binder solution is sprayed onto the tumbling bed of particles. The spray of volatility inhibiting borate binder solution results in the additional nutrient supplying fine powders to adhering to the urea surface. The spray of volatility inhibiting borate binder solution can be repeated at multiple points along the length of the rotating drum to ensure complete binding of the fine powders to the surface of the urea granule.

Mechanically fluidized beds involve the use of series of paddles or plows to cause the urea granules and desired additional nutrient supplying fine powders to be constantly suspended within the mixing vessel. As the suspended particles rotate inside the vessel the volatility inhibiting binder is sprayed into the particle suspension. The binder solution causes the particles to adhere together. For this type of mixing equipment the particles initially formed after all binder has been introduced may have a grainy surface coating. The grainy surface coating will disappear if mixing of the particles is continued. The required mixing times were observed to be about 2 times the length of time needed to complete the spraying of the binder into the particle suspension inside the mixing vessel.

The selection of the aqueous volatility inhibiting borate-containing solution (amino alcohol borate or borate containing complex ions of a divalent metal with ethanolamine) for the coating of urea (with or without additional nutrients) can be made based upon local requirements. While many of the examples which follow use the borate solution containing complex ions of copper (II) with ethanolamine because of its better low temperature stability; any one of the volatility inhibiting borate solutions could be used depending upon local conditions. If high boron content is needed then it would be preferable to use an ethanolamine borate solution. If zinc is needed then a borate solution containing complex-ions of zinc with ethanolamine should be used. Higher viscosity compositions may work better in warm weather and the triethanolamine borate solution could be used under those conditions.

Coating encompasses one of two ideas: the distributing of a liquid coating agent onto the surface of a solid substrate; or the addition of a layer of fine powders onto the surface of a solid substrate. For the second type of coating technique a liquid binding agent may be needed to permit adhesion of the fine particles to the granular surface. In the first case the final particle will often be the same size as the pre-existing granule and will have acquired new properties such as hardness, water impermeability or in our case reduced volatility. In the second case, the particle may be larger in size and the new properties result from properties of the binding agent and the choice of fine powders selected for the surface layer. In our invention the binding agent acts as a volatility control agent and the fine powders act as plant nutrient supplying substances.

Successful coating requires adhesion of materials to an existing particle. The adhesive forces between particles can include physical phenomena and/or chemical reactions where stable chemical bonds between the substrate and added materials form. The physical phenomena that result in adhesion are Van der Waals bonds, ionic bonds and hydrogen bonding. When physical phenomena are involved in the adhesive mechanism a combination of interacting forces often result in greater strength than a single force. Thus, coating agents/binding agents for physical adhesion are more desirable if they support multiple adhesion mechanisms.

In the present invention, physical adhesion mechanisms are believed to dominate. The volatility inhibiting binding agent (coating agent) contains a chemical group capable of ionic interactions that involves a borate anion and an amino alcohol ammonium ion or a borate anion and a mixture of cations that includes the cation formed by ethanolamine metal complex and the ammonium ion of ethanolamine. In all cases the hydroxyl group of the amino alcohol acts as a hydrogen bond forming structure that can adhere to the urea particle via the hydrogen bonds.

The binding mechanism(s) could be supported by a number of other chemical combinations provided that the binding agent has the ability to reduce the nitrogen loss from urea when used in a coating process. The apparent minimal requirement for a binding agent of the invention is a group capable of forming an ionic borate structure and a hydrogen bonding group. In ethanolamine the borate forming structure is the amino group and the hydrogen binding agent is the alcohol group. Any water soluble amino alcohol such as diethanolamine and triethanolamine, the amino propanols and the amino butanols have both a borate forming and hydrogen bonding group.

For the volatility inhibiting borate solution containing the ethanolamine complex of a divalent metal the borate ion is formed when the alkaline solution containing the ethanolamine complex of the metal reacts with boric acid. The hydrogen bonding group is in the case of ethanolamine the primary alcohol group. Ethanolamine is suited because of its large formation constant when forming metal complexes. Stability constants for the formation of complex ions are often expressed in logarithmic form (See *Stability Constants of Metal-Ion Complexes* (Special Publication SP No. 17) published by The Chemical Society (Burlington House London WIV OBN, 1964) and Stability Constants of Metal-Ion Complexes Supplement No 1 (Special Publication SP No. 25) published by The Chemical Society (Burlington House London WIV OBN, 1971). The stability constants (as logarithms) for complexes with copper (II) and ethanolamine involving 4 molecules of ethanolamine are 16.48 (SP No. 17) and 15.44 (SP No. 25). The stability constants (as logarithms) for complex ion of copper (II) with diethanolamine involving 4 molecules of diethaolamine are 16.00 (SP No. 17) and 14.6 (SP No. 25). The stability constants (as logarithms) for complex ion of zinc with ethanolamine involving 4 molecules of ethanolamine are 9.2 to 9.4 (SP No. 25) and the stability constant (as a logarithm) for the complex ion of zinc with diethanolamine involving 4 molecules of diethanolamine is 9.11 (SP No. 25). The ability to prepare borate solutions from a solution of the complex ion of copper (II) or zinc ion with an amino alcohol is limited to those amino alcohols which form complex ions with copper (II) or zinc that have stability constants greater than $10^9$ (logarithm of stability constant greater than 9) for the complex ions having 4 moles of amino alcohol per mole of metal. Ethanolamine and diethanolamine are preferred.

Polyols are an additional class of substances capable of forming borates which also contain a hydrogen bonding group. The polyols include sugars (glucose, fructose, ribose, and sucrose) and sugar alcohols (sorbitol, mannitol, and glycerol) and sugar acids (glucoheptonates, and gluconates). These substances are known to form complexes with boric acid and in fact increase the acidity of boric acid. Th e complex involving the polyol with boric acid joins two adjacent hydroxyl groups of the polyol in a borate anion. A hydrogen ion is released as the borate anion forms. The remaining hydroxyl groups of the polyol provide the hydrogen bonding groups.

The primary weakness of the polyol group is the low amount of boron which is present in the resulting aqueous solutions. The borate complex of many sugars is unstable and boric acid will precipitate easily. Sugars are nutrient source for soil bacteria and may increase microbial attack upon the urea particle. The borate complexes of some commercially available sugar acids are typically very viscous and difficult to handle. We, also, have observed that when mixtures of some commercially available sugar acids with amino alcohol borates (e.g. ethanolamine borate) are prepared that the resulting mixtures lose their ability to reduce nitrogen losses when coated onto granular urea.

Thus, the sugar alcohols would be preferred materials for forming a volatility inhibiting binder mixture. We have found that the borate complex of sorbitol will acts as a good binding agent when preparing ammonium sulfate coated urea fertilizers. When a plant species is particularly sensitive to boron, the low boron content of the sorbitol boric acid complex should permit manufacture of urea coated fertilizers of limited boron content.

The ability of a binding agent to effectively hold two or more particles together can depend upon the viscosity of the binding agent. Coalescing particles must have sufficient time in contact with each other for the adhesive forces to develop before attrition forces due to mixing separate the particles. The quality of products resulting from a coating (agglomeration) technique are often improved by binding agents with high viscosity.

The quality of the coated products prepared from the amino alcohol borates is believed to vary with the viscosity of the volatility inhibiting binding solution. Products composed of urea, a volatility inhibiting binding agent and additional nutrient supplying fine powders require longer mixing times to achieve adequate coating when the viscosity of the volatility inhibiting binding agent is around 30 cps (measured at room temperature). Mixing times are much shorter and the coverage of the urea granules is generally better when the viscosity of the volatility inhibiting binding agent is over 60 cps measured at room temperature).

The viscosity of the volatility inhibiting binding mixtures of the invention (amino alcohol borates and borate solutions containing the ethanolamine complexes of copper (II) or zinc) depends upon both boron content of the mixture and final solution pH. In general the lower the pH and boron content the lower the viscosity. To improve performance during coating particularly when additional nutrient supplying substances are needed, a volatility inhibiting binding agent can be selected which has a higher viscosity such as diethanolamine or triethanolamine. Mixtures of ethanolamine with diethanolamine (preferred if the borate solution contains a complex ion of a metal with an amino alcohol) or triethanolamine can be used to increase the solution viscosity. Alternatively, commercially available materials known to act as thickening agents such as glycerol, low glucose content polysaccharides, polysaccharide gums could be added as viscosity control agents. The additional viscosity control agent must not react with copper (II) in alkaline solution which is characteristic of corn syrups, thus, corn syrups are not preferred viscosity enhancing agents when used with the volatility inhibiting mixture contains copper (II).

BRIEF DESCRIPTION OF THE DRAWINGS

The attached figures will be described in detail in the description of the invention:

FIG. 1 illustrates the cumulative nitrogen loss for urea and phosphate coated urea prepared with an ethanolamine borate solution containing 6.22% B. Volatility was measured at 28° C. on a soil with a pH of 4.9 and a moisture content of 15%. Samples were applied at a rate equivalent to 180 lb N/acre.

FIG. 2 illustrates the cumulative nitrogen loss for urea and phosphate coated urea prepared with an borate solution containing a complex ion copper (II) with ethanolamine at containing 6.22% B and 1.00% Cu. Volatility was measured at 28° C. on a soil with a pH of 4.0 and a moisture content of 15%. Samples were applied at a rate equivalent to 180 lb N/acre.

FIG. 3 illustrates the cumulative nitrogen loss for urea and phosphate coated urea prepared with an borate solution containing a complex ion of copper (II) with ethanolamine containing 6.22% B and 1.00% Cu. Volatility was measured at 28° C. on a soil with a pH of 4.9 and a moisture content of 15%. Samples were applied at a rate equivalent to 180 lb N/acre.

FIG. 4 illustrates the cumulative nitrogen loss for urea and phosphate coated urea prepared with an borate solution containing a complex ion of zinc with ethanolamine containing 6.22% B and 1.00% Zn. Volatility was measured at 28° C. on a soil with a pH of 4.0 and a moisture content of 15%. Samples were applied at rate equivalent to 180 lb N/acre.

FIG. 5 illustrates the cumulative nitrogen loss for urea and coated urea prepared zinc sulfate, potassium magnesium sulfate and a borate solution containing a complex ion of copper (II) with ethanolamine containing 6.22% B and 1.00% Cu. Volatility was measured at 28° C. on a soil with a pH of 4.9 and a moisture content of 15%. Samples were applied at rate equivalent to 180 lb N/acre.

DETAILED DESCRIPTION OF THE INVENTION

Nitrogen release as ammonia following the application of fertilizer to soils can occur for a lengthy time period. The conditions chosen for the soil used in connection with the following examples were selected to give rapid ammonia release in 2 days. Nitrogen release as ammonia was measured by an adaptation of the methods described by Terman. The amount of fertilizer sample used was adjusted to be equivalent to 180 lb N per acre. Fertilizer samples were placed on soil that had been moistened to about 15% moisture and incubated at 28° C. for the desired time. Moisture saturated air was passed continuously over the fertilized soil sample and ammonia released as the fertilizer sample dissolved was collected in 50 ml of 0.02 M citric acid. The citric acid solution was replaced with fresh solution at periodic intervals. Ammonia dissolved in the citric acid collection solution was determined using a gas sensing ammonia electrode. Collected ammonia samples and standards were diluted in volumetric glassware to 100 mL volume before ammonia measurements.

Soil samples for the volatility studies were collected and immediately air dried to about 3% moisture for storage. After drying, the soil was screened to pass a 1.7 mm opening. If a sample contained large amount of leaf litter the screening process was repeated with a sieve having a 1 mm opening. This became necessary to maintain constant soil depth in the volatility measurement chamber. Immediately prior to use in a volatility study the soil sample was moistened to about 15% moisture with water. The analyses of the moistened soils used are shown in table 1. The nitrogen release at 2 days and 4 days is shown for all soils for urea applied at 180 lb N/acre.

TABLE 1

Properties of Soil Used and Percent Loss of Urea Nitrogen at 28° C. when Applied to a Soil at 15% Moisture at 180 lb N/acre

| | Soil Sample Number | | | |
|---|---|---|---|---|
| | 1 | 2 | 3 | 4 |
| PH | 7.2 | 4.0 | 4.9 | 5.0 |
| Organic matter % | 5.8 | 9.9+ | 9.4 | 7.7 |
| Estimated nitrogen release (lbs/Acre) | 140 | 140 | 140 | 140 |

TABLE 1-continued

Properties of Soil Used and Percent Loss
of Urea Nitrogen at 28° C. when
Applied to a Soil at 15% Moisture at 180 lb N/acre

|  | Soil Sample Number | | | |
| --- | --- | --- | --- | --- |
|  | 1 | 2 | 3 | 4 |
| Cation exchange capacity (meq/100 g) | 5.2 | 3.5 | 3.5 | 5.7 |
| Buffer index | — | 6.45 | 6.08 | 6.02 |
| Calcium (mg/kg) | 1700 | 200 | 640 | 490 |
| Phosphorus (mg/kg) | 28 | 14 | 28 | 21 |
| Potassium (mg/kg) | 32 | 52 | 96 | 54 |
| Magnesium (mg/kg) | 63 | 38 | 79 | 66 |
| Percent Urea Nitrogen Lost at 2 days | 52.3 | 21.6 | 34.0 | 31.1 |
| Percent Urea Nitrogen Lost at 4 days | 59.2 | 24.9 | 37.1 | 34.0 |

The following examples illustrate the practice of the invention. Other useful coated urea compositions using the volatility inhibiting borate binding solutions are possible. The initial examples describe the formation of the volatility inhibiting borate solutions used to prepare the coated urea products of the invention.

Compositions are expressed in mass percentages unless otherwise noted. When reference is made to a specific element in a composition then the mass percentage is given preceding the symbol for the element—for example; 1.0% B refers to a mixture having 1.0% elemental boron.

EXAMPLE 1

An aqueous volatility inhibitor solution comprised of ethanolamine borates 9.02% B was prepared by mixing ethanolamine with water and then adding boric acid until all components were dissolved. The volatility inhibiting ethanolamine borate solution was composed of 18.0% ethanolamine, 30.4% water and 51.6% boric acid. The solution pH was 8.3.

EXAMPLE 2

An aqueous volatility inhibitor solution comprised of ethanolamine borates containing 6.22% B was prepared as in Example 1. The volatility inhibiting solution was composed of 12.4% ethanolamine, 52.0% water and 35.6% boric acid. The solution pH was 7.6.

EXAMPLE 3

An aqueous volatility inhibitor solution comprised of triethanolamine borates containing 6.22% B was prepared as in example 1 using triethanolamine. The volatility solution was composed of 44.1% triethanolamine, 4.3% water and 51.5% boric acid. Triethanolamine and water were mixed and then the boric acid was added and mixing continued until the volatility inhibitor solution of triethanolamine borate formed. The solution pH was 7.6.

EXAMPLE 4

An aqueous volatility inhibitor solution comprised of a mixture of borates and complex ions of copper II with ethanolamine containing 6.22% B and 1.00% Cu was prepared. The volatility inhibiting solution was composed of: 4.00% copper (II) sulfate pentahydrate (25.4% Cu); 35.6% boric acid, 12.4% ethanolamine; 10.6% ethylene glycol and 37.4% water. The volatility inhibiting solution was made by adding copper (II) sulfate to water and then adding ethylene glycol. Ethanolamine was added to form a blue colored complex with ethanolamine. Boric acid was then added to form the volatility inhibiting borate solution containing the ethanolamine complex with copper (II). Ethylene glycol was used to inhibit freezing of the mixture and can be omitted if low temperature storage is not needed. The solution pH was 7.3.

EXAMPLE 5

An aqueous volatility inhibitor solution comprised of a mixture of borates and complex ions of copper (II) with ethanolamine containing 6.22% B and 2.31% Cu was prepared. The volatility inhibiting solution was composed of: 9.10% copper (II) sulfate pentahydrate (25.4% Cu); 35.6% boric acid, 12.4% ethanolamine; 5.50% ethylene glycol and 37.4% water. The components of the volatility inhibiting solution were mixed in the order indicated in example 4. The solution pH was 6.11 and a small amount of crystalline material develops after 2 months storage.

EXAMPLE 6

An aqueous volatility inhibiting solution comprising a mixture of borates and complex ions of copper (II) with ethanolamine 5.35% B and 4.60% Cu was prepared. The volatility inhibiting solution was composed of: 12.6% copper (II) chloride dihydrate (36.7% Cu); 31.6% boric acid, 27.0% ethanolamine and 28.8% water. The copper (II) chloride was dissolved in water and then ethanolamine was added to form the copper (II) ethanolamine complex. Boric acid was then added to form the volatility inhibitor borate solution containing the ethanolamine complex with copper (II) complex. The solution pH was 8.8.

EXAMPLE 7

An aqueous volatility inhibiting solution comprising a mixture of borates complex ions of zinc with ethanolamine 6.22% B and 1.00% Zn was prepared. The volatility inhibiting solution was composed of: 3.1% zinc sulfate (35% Zn), 35.6% boric acid, 12.4% ethanolamine and 48.9% water. The mixture was prepared by dissolving the zinc sulfate in water and adding ethanolamine to form the zinc ethanolamine complex. Boric acid was added to from volatility inhibiting borate solution containing the ethanolamine complex with zinc. The solution pH was 7.6.

The composition of the solutions prepared as volatility inhibitors is summarized in Table 2. The solution of Example 5 developed crystals of boric acid over time and this is due to the low pH of that mixture compared to the other mixtures. Volatility inhibiting borate solutions having greater zinc content than the mixture of Example 7 can be prepared provided that the zinc to ethanol amine molar ratio and ethanol amine (corrected for the solution pH after the metal complex forms) to boric acid is controlled as indicated below.

TABLE 2

Composition and Properties of Volatility Inhibiting Solutions

Amino Alcohol Borate Solutions

| | Example | | |
|---|---|---|---|
| | 1 | 2 | 3 |
| Stabilizer | MEA | MEA | TEA |
| % Boron in Solution | 9.02% | 6.22% | 6.22% |
| % Water in Solution | 30.4 | 35.6 | 4.3 |
| % Amino alcohol in Solution | 18.0 | 12.4 | 44.1 |
| % Boric Acid in Solution | 51.6 | 52.0 | 51.5 |
| Final pH | 8.3 | 7.6 | 7.6 |

Borate Solutions Containing Complex Ions of Copper (II) with Ethanolamine

| | Example | | | |
|---|---|---|---|---|
| | 4 | 5 | 6 | 7 |
| % Boron in Solution | 6.22 | 6.22 | 5.35 | 6.22 |
| Metal in Solution | Cu | Cu | Cu | Zn |
| % Metal in Solution | 1.00 | 2.31 | 4.60 | 1.00 |
| Metal Salt Used | $CuSO_4.5H_2O$ | $CuSO_4.5H_2O$ | $CuCl_2.2H_2O$ | $ZnSO_4.5H_2O$ |
| % Water in Solution | 37.4 | 37.4 | 28.8 | 48.9 |
| % Metal Salt in Solution | 4.00 | 9.10 | 12.6 | 3.10 |
| % MEA in Solution | 12.4 | 12.4 | 27.0 | 12.4 |
| % Boric Acid in Solution | 35.6 | 35.6 | 31.6 | 35.6 |
| % Ethylene Glycol in Solution | 10.6 | 5.50 | — | — |
| Final Solution pH | 7.3 | 6.1 | 8.8 | 7.6 |

Abbreviations: Ethanolamine = MEA; Triethanolamine = TEA
Note A: The complex ions believed present are $[Cu(C_2H_7ON)_4]^{2+}$ or $[Zn(C_2H_7ON)_4)]^{2+}$ where $C_2H_7ON$ represents ethanolamine.

The room temperature stability of the borate solutions containing complex ions of copper (II) or zinc with ethanolamine varies depending upon the molar ratios of metal to ethanolamine and molar ration of unbound ethanolamine to boric acid. The molar ratios for the components of volatility inhibiting solutions that contain mixtures of borates and divalent metal complexes with ethanolamine are indicated in Table 3. For copper containing mixtures the molar ratio of metal to ethanolamine for the solution which crystallized at room temperature was 5:57:1. In that solution, the molar ratio of boric acid to unbound ethanolamine (corrected for the solution pH when the metal complex had formed was 14:1). For the stable copper (II) containing mixtures the ratio of boric acid to unbound ethanolamine is slightly less than 8. For zinc containing mixtures the molar ratio of ethanolamine to metal must be 10 or greater and the molar ratio of boric acid to unbound base (corrected for solution pH when the metal complex forms) must be less than 5:1.

TABLE 3

Room Temperature Stability to Boric Acid Precipitation of Volatility Inhibiting Solutions Composed of A Borate Solution Containing Complex Ions of Copper (II) or Zinc with Ethanolamine

| | Example | | | |
|---|---|---|---|---|
| | 4 | 5 | 6 | 7 |
| Metal in Complex Ion | Cu (II) | Cu (II) | Cu (II) | Zn |
| % Boron in Solution | 6.22 | 6.22 | 5.35 | 6.22 |
| % Metal in Solution | 1.00 | 2.31 | 4.60 | 1.00 |
| Final Solution pH | 7.3 | 6.1 | 8.8 | 7.6 |
| Crystals of $H_3BO_3$ Formed on Standing at Room Temperature | no | yes | no | no |
| Moles Metal in Solution | 0.0160 | 0.0364 | 0.0728 | 0.0166 |
| Total Moles MEA in Solution | 0.203 | 0.0203 | 0.443 | 0.203 |
| Molar Ratio MEA: Metal | 12.7:1 | 5:57:1 | 6.09:1 | 12.2:1 |
| Moles Unbound MEA after 4:1 Complex Ion Forms | 0.139 | 0.0574 | 0.152 | 0.137 |
| pH before addition of Boric Acid | 10.6 | 9.9 | 9.4 | 10.7 |
| Moles $H_3BO_3$ in solution | 0.576 | 0.576 | 0.511 | 0.576 |
| Moles Unbound MEA at Solution pH before addition of $H_3BO_3$ Note A | 0.129 | 0.0411 | 0.0673 | 0.131 |

TABLE 3-continued

Room Temperature Stability to Boric Acid Precipitation of
Volatility Inhibiting Solutions Composed of A
Borate Solution Containing Complex Ions of Copper (II) or Zinc with Ethanolamine

|  | Example | | | |
|---|---|---|---|---|
|  | 4 | 5 | 6 | 7 |
| Mole Ratio $H_3BO_3$ to Unbound Amino Alcohol at Solution pH before $H_3BO_3$ Addition | 4.5:1 | 14:1 | 7.6:1 | 4.4:1 |

Abbreviations: Ethanolamine = MEA; Triethanolamine = TEA
Note A Calculated using Henderson-Hasselbach Equation ($pK_a$ = 9.50 for MEA)
Note B The complex ions formed by reaction of the metal ion solution with ethanolamine are [Cu$(C_2H_7ON)_4]^{2+}$ or [Zn$(C_2H_7ON)_4)]^{2+}$ where $C_2H_7ON$ represents ethanolamine.

In the preparation of all of the volatility inhibiting borate solutions containing metal ethanolamine complexes, heat is liberated by the reaction of ethanolamine with the aqueous metal ion solution. The heat appears to help to dissolve the boric acid. Heat can be used if needed to speed up the process of forming the solution, provided the pH does not drop below 6 while the solution is being prepared.

The ability of the solutions of Examples 1 to 7 to reduce the nitrogen loss when coated onto urea is shown in Examples 8 to 14. The remaining examples indicate the additional range of compositions that can be prepared with any of the volatility inhibiting borate solutions of Examples 1 to 7.

To prepare volatility reduced coated urea products from volatility inhibiting amino alcohol borates; granular urea was mixed with a desired amount of the amino alcohol borate solution for about 30 seconds. The urea granules wetted with the volatility inhibitor solution were placed in a closed container and were mixed occasionally for several days to allow urea granules to absorb applied volatility inhibitor and to obtain a free flowing material. The length of time required for the urea granules to absorb the volatility inhibitor solution varied with the amount of solution applied to the urea granule.

EXAMPLE 8

A volatility reduced coated urea product was formed by coating granular urea with a solution of a volatility inhibiting ethanolamine borate solution of Example 1 containing 9.02% B. The coated product prepared as described above was composed of 97.5% urea and 2.5% of the volatility inhibiting ethanolamine borate solution. The resulting coated urea contained 45.0% N and 0.23% B before water removal. Reduction in nitrogen release for the coated urea product of Example 8 is shown in Table 4. Volatility reduction data is expressed relative to a urea control sample run at the same time.

EXAMPLE 9

Volatility reduced coated urea products were prepared from granular urea and a volatility inhibiting ethanolamine borate solution of example 2 containing 6.22% boron. Several coated samples prepared as described previously were made:

A) A coated granular urea product was prepared that contained 97.5% urea and 2.5% of the volatility inhibitor solution. The resulting coated urea contained 44.9% N and 0.15% B before water removal.

B) A coated granular urea product was prepared that contained 97.0% urea and 3.0% of the volatility inhibitor solution. The resulting coated urea contained 44.7% N and 0.19% B before water removal.

C) A coated granular urea product was prepared that contained 96.3% urea and 3.7% of the volatility inhibitor solution. The resulting coated urea contained 44.4% N and 0.23% B before water removal.

Reduction in nitrogen release for the coated urea products prepared of examples 9A–9C is shown in Table 4.

EXAMPLE 10

A volatility inhibited coated urea product was prepared from granular urea and a volatility inhibiting triethanolamine borate solution of Example 3 containing 6.22% boron. The product was composed of 97.0% urea and 3.0% of the volatility inhibitor solution. The resulting coated urea product contained 44.7% N and 0.19% B before water removal. Reduction in nitrogen release for the coated urea product of Example 10 is shown in Table 4.

TABLE 4

Reduction in Volatile Nitrogen Loss Compared to Uncoated Urea
Over Time at 28° C. for Urea Coated with Ethanolamine
(MEA) Borate Solutions or Triethanolamine (TEA) Borate Solution

| | | Soil Conditions | | Nitrogen Applied | Boron Applied | Reduction in Cumulative Nitrogen Loss Compared to Uncoated Urea at | | | |
|---|---|---|---|---|---|---|---|---|---|
| Example | Solution | PH | Moisture % | Mg | mg | 0.5 day | 1.0 day | 1.5 day | 2.0 day |
| 8 | MEA-Borate (9.02% B) | 7.2 | 16.0 | 90.3 | 0.44 | 72% | 32% | 21% | 20% |

TABLE 4-continued

Reduction in Volatile Nitrogen Loss Compared to Uncoated Urea
Over Time at 28° C. for Urea Coated with Ethanolamine
(MEA) Borate Solutions or Triethanolamine (TEA) Borate Solution

| | | Soil Conditions | | Nitrogen Applied | Boron Applied | Reduction in Cumulative Nitrogen Loss Compared to Uncoated Urea at | | | |
|---|---|---|---|---|---|---|---|---|---|
| Example | Solution | PH | Moisture % | Mg | mg | 0.5 day | 1.0 day | 1.5 day | 2.0 day |
| 8 | MEA Borate (9.02% B) | 7.2 | 15.9 | 85.8 | 0.43 | 49% | 17% | 7.4% | 6.7% |
| 9A | MEA Borate (6.22% B) | 4.9 | 15.5 | 88.7 | 0.30 | 72% | 21% | 11% | 9.4% |
| 9B | MEA Borate (6.22% B) | 4.9 | 15.5 | 89.6 | 0.38 | 80.4% | 25% | 14% | 12% |
| 9C | MEA Borate (6.22% B) | 4.9 | 15.6 | 88.3 | 0.46 | 95% | 42% | 12% | 6.9% |
| 10 | TEA Borate (6.22% B) | 4.9 | 15.5 | 89.0 | 0.38 | 94% | 45% | 21% | 20% |

Compositions of the products of Examples 8–10 are shown in Table A

Several coated urea products were then prepared as indicated previously:

TABLE A

Composition of Coated Products Prepared from Amino Alcohol Borates Before and After Water Removal

| | Example | | | | |
|---|---|---|---|---|---|
| | 8 | 9A | 9B | 9C | 10 |
| | Composition As Prepared | | | | |
| Coating Agent | MEA Borate (9.02% B) | MEA Borate (6.22% B) | MEA Borate (6.22% B) | MEA Borate (6.22% B) | TEA Borate (6.22% B) |
| Amino Alcohol | MEA | MEA | MEA | MEA | TEA |
| % Urea | 97.5 | 97.5 | 97.0 | 96.3 | 97.0 |
| % Coating Agent | 2.5 | 2.5 | 3.0 | 3.7 | 3.0 |
| | Composition Before Water Removal | | | | |
| Total N (%) | 45.0 | 44.9 | 44.7 | 44.4 | 44.7 |
| Urea N (%) | 44.9 | 44.9 | 44.6 | 44.3 | 44.6 |
| Boron (%) | 0.23 | 0.16 | 0.19 | 0.23 | 0.19 |
| Amino Alcohol (%) | 0.45 | 0.31 | 0.37 | 0.46 | 1.32 |
| Water (%) | 0.76 | 1.30 | 1.56 | 1.92 | 0.13 |
| Dry Substance (%) | 99.24 | 98.70 | 98.44 | 98.08 | 99.87 |
| | Composition After Water Removal | | | | |
| Urea (%) | 98.3 | 98.8 | 98.5 | 98.2 | 97.1 |
| Total N(%) | 45.3 | 45.5 | 45.4 | 45.3 | 44.8 |
| Urea N (%) | 45.2 | 45.4 | 45.3 | 45.2 | 44.7 |
| Boron (%) | 0.23 | 0.16 | 0.19 | 0.23 | 0.19 |
| Amino Alcohol (%) | 0.45 | 0.31 | 0.38 | 0.47 | 1.32 |

Abbreviations: Ethanolamine (MEA); Triethanolamine (TEA)
Total nitrogen represents sum of urea nitrogen and nitrogen in amino alcohol used in preparing product

EXAMPLE 11

Volatility inhibited coated urea products were prepared from granular urea and a volatility inhibiting borate solution containing complex ion of copper (II) with ethanolamine of Example 4 containing 6.22% boron and 1.00% copper.

A) A coated urea product was prepared which contained 2.2% volatility inhibiting solution and 97.8% granular urea. The composition of the coated granules was 45.1% N, 0.14% B and 0.022% Cu before water removal.

B) A coated urea product was prepared which contained 3.0% volatility inhibitor solution and 97.0% granular urea The composition of the coated granules was 44.7% N, 0.19% B and 0.031% Cu before water removal.

C) A coated urea product was prepared which contained 3.7% volatility inhibitor solution and 96.3% granular urea. The composition of the coated granules was 44.4% N, 0.23% B and 0.037% Cu before water removal.

Reduction in nitrogen release for the coated urea products of Examples 11A–11C are shown in Table 5. Volatility reduction data is expressed relative to a urea control sample run at the same time.

EXAMPLE 12

A volatility inhibited coated urea product was prepared from granular urea and volatility inhibiting borate solution containing complex ions of copper (II) with ethanolamine of Example 5 containing 2.31% copper and 6.22% boron. A coated product was produced as indicated previously using 3.0% of the volatility inhibiting solution and 97.0% granular urea. The composition of the coated granular urea product was 44.7% N, 0.19% B, and 0.071% Cu before water removal. The reduction in nitrogen release for the coated urea products of Examples 12 is shown in Table 5.

EXAMPLE 13

A volatility inhibited coated urea product was prepared from granular urea and volatility inhibiting solution borate solution containing complex ions of copper (II) with ethanolamine of Example 6 containing 4.60% copper and 5.35% boron. The product made consisted of 3.0% of volatility inhibitor solution and 97.0% urea. The composition of the granular urea product was 44.7% N, 0.17% B, and 0.14% Cu before water removal. The reduction in nitrogen release for the coated urea product of Example 6 is shown in Table 5.

EXAMPLE 14

A volatility reduced coated urea products was prepared from the borate solution containing the complex ions of zinc with ethanolamine of Example 7 containing 1.00% zinc and 6.22% boron and granular urea. A coated urea product was prepared using 3.0% of the volatility inhibitor solution and 97.0% urea. The composition of the granular urea product was 44.7% N, 0.19% B, and 0.031% Zn before water removal. The reduction in nitrogen release for the coated urea product of Example 7 is shown in Table 5.

TABLE 5

Reduction in Volatile Nitrogen Loss Compared to Uncoated Urea Over Time at 28° C. on Various Soils When Applied at a Rate of 180 lb N/acre for Urea Coated with Borate Solutions Containing Complex Ions of Copper (II) or Zinc with Ethanolamine[Note A]

| | Solution | % Element in Coated Product | | | Soil pH | Soil Moisture | Reduction in Cumulative Nitrogen Loss Compared to Uncoated Urea at | | | |
|---|---|---|---|---|---|---|---|---|---|---|
| | | N | B | Metal | | | 0.5 days | 1.0 days | 1.5 days | 2.0 days |
| 11A | Borate [MEA Cu] (6.22% B; 1.00% Cu) | 45.1 | 0.14 | 0.022 | 7.2 | 15.8 | 33% | 7.0% | 3.4% | 3.0% |
| 11A | Borate [MEA Cu] (6.22% B; 1.00% Cu) | 45.1 | 0.14 | 0.022 | 7.2 | 15.9 | 30% | 9.9% | 4.8% | 4.5% |
| 11A | Borate[MEA Cu] (6.22% B; 1.00% Cu) | 45.1 | 0.14 | 0.022 | 7.2 | 15.8 | 37% | 5.8% | 3.3% | 3.0% |
| 12 | Borate [MEA Cu] (6.22% B; 2.31% Cu) | 44.7 | 0.19 | 0.071 | 7.2 | 15.8 | 45% | 7.0% | 3.6% | 3.2% |
| 13 | Borate [MEA Cu] (5.35% B; 4.60% Cu) | 44.7 | 0.17 | 0.14 | 7.2 | 15.8 | 33% | 7.0% | 4.3% | 3.8% |
| 14 | Borate [MEA Zn] (6.22% B; 1.00% Zn) | 44.7 | 0.19 | 0.031 | 7.2 | 15.4 | 44% | 8.4% | 3.1% | 2.7% |
| 11A | Borate [MEA Cu] (6.22% B; 1.00% Cu) | 45.1 | 0.14 | 0.022 | 4.9 | 15.7 | 92% | 34% | 7.2% | 3.9% |
| 11B | Borate [MEA Cu] (6.22% B; 1.00% Cu) | 44.7 | 0.19 | 0.031 | 4.9 | 15.7 | 91% | 30% | 9.4% | 5.3% |
| 11C | Borate [MEA Cu] (6.22% B; 1.00% Cu) | 44.4 | 0.23 | 0.037 | 4.9 | 15.7 | 96% | 49% | 20% | 15% |
| 14 | Borate [MEA Cu] (6.22% B; 1.00% Zn) | 44.7 | 0.19 | 0.031 | 4.9 | 15.6 | 92% | 33% | 8.5% | 5.8% |

[Note A] Borate [MEA Cu ] refers to a borate solution containing the ethanolamine complex of Cu(II)

Compositions of the products of Examples 11–14 are shown in Table B.

TABLE B

Composition of Coated Products Prepared from a Borate Solution Containing Complex Ions of A Divalent Metal (Borate [EA Metal]) with Ethanolamine Before and After Water Removal

| | \multicolumn{6}{c}{Example} | | | | | |
|---|---|---|---|---|---|---|
| | 11A | 11B | 11C | 12 | 13 | 14 |
| \multicolumn{7}{c}{Composition as Prepared} | | | | | | |
| Coating Agent % B, % Metal in Coating Agent | Borate [EA Cu] 6.22% B, 1.00% Cu | Borate [EA Cu] 6.22% B, 1.00% Cu | Borate [EA Cu] 6.22% B, 1.00% Cu | Borate [EA Cu] 6.22% B, 1.00% Cu | Borate [EA Cu] 6.22% B, 1.00% Cu | Borate [EA Zn] 6.22% B, 1.00% Cu |
| Metal Salt[Note A] | $CuSO_4 \cdot 5 H_2O$ | $CuSO_4 \cdot 5 H_2O$ | $CuSO_4 \cdot 5 H_2O$ | $CuSO_4 \cdot 5 H_2O$ | $CuCl_2 \cdot 2 H_2O$ | $ZnSO_4$ (35% Zn) |
| % Urea | 97.8 | 97.0 | 96.3 | 97.0 | 97.0 | 97.0 |
| % Coating Agent | 2.20 | 3.00 | 3.70 | 3.00 | 3.00 | 3.00 |
| \multicolumn{7}{c}{Composition Before Water Removal} | | | | | | |
| % Water[Note B] | 0.82 | 1.12 | 1.38 | 1.12 | 0.86 | 1.47 |
| % Non Aqueous Substances | 99.18 | 98.88 | 98.62 | 98.88 | 99.14 | 98.53 |
| Ethanolamine % | 0.27 | 0.37 | 0.46 | 0.37 | 0.81 | 0.37 |
| % Boron Compounds | 0.78 | 1.07 | 1.32 | 1.07 | 0.95 | 1.07 |
| % Ethylene Glycol | 0.23 | 0.32 | 0.39 | 0.17 | 0 | 0 |
| Total N % | 45.1 | 44.7 | 44.4 | 44.7 | 44.8 | 44.7 |
| Urea N % | 45.0 | 44.6 | 44.3 | 44.6 | 44.6 | 44.6 |
| Boron % | 0.14 | 0.19 | 0.23 | 0.19 | 0.16 | 0.19 |
| Metal % | 0.022 | 0.030 | 0.037 | 0.069 | 0.138 | 0.030 |
| \multicolumn{7}{c}{Composition After Water Removal} | | | | | | |
| % Urea | 98.61 | 98.10 | 97.65 | 98.10 | 97.84 | 98.45 |
| Ethanolamine % | 0.27 | 0.38 | 0.47 | 0.38 | 0.82 | 0.38 |
| % Boron Compounds | 0.79 | 1.08 | 1.33 | 1.08 | 0.96 | 1.08 |
| % Ethylene Glycol | 0.24 | 0.32 | 0.40 | 0.17 | | |
| Total N %[Note C] | 45.4 | 45.2 | 45.0 | 45.2 | 45.2 | 45.4 |
| Urea N % | 45.4 | 45.1 | 44.9 | 45.1 | 45.0 | 45.3 |
| Boron % | 0.14 | 0.19 | 0.23 | 0.19 | 0.16 | 0.19 |
| Metal % | 0.022 | 0.030 | 0.038 | 0.070 | 0.14 | 0.030 |

[Note A]% Zn given for zinc sulfate waters of hydration unknown;
[Note B]Does not include waters of hydration of metal salt used.
[Note C]Total of nitrogen in urea and ethanolamine.

The data in Tables 4 and 5 demonstrate that the amino alcohol borate solutions and borate solutions containing the amino alcohol complex with divalent metals are able to reduce the nitrogen loss from urea when urea coated with them is applied to the surface of the soil. The remaining examples indicate how other interesting compositions can be formed which exploit the ability of these two classes of volatility reducing compositions in making urea containing fertilizer compositions.

In the examples, MAP refers to monoammonium phosphate or ammonium dihydrogen phosphate. The material is commercially available in several grades and the composition of the material used is denoted with the percentage of nitrogen and percentage of phosphorus (the $P_2O_5$ content can be obtained by multiplying the % P by 2.2913). To further characterize the MAP powder used the pH of a 5% (w/v) solution (5 g material in 100 mL of water) will be indicated. The MAP used for Examples 15–17 contained 10.0% N, 21.8% P and a 5% (w/v) solution had a pH of 3.6. The term "finely powdered" is used to denote a powdered material in which at least 90% of the mass of the material will pass through an opening of 149 micrometers (100 mesh standard sieve).

The coating step was accomplished by mixing granular urea (46% N) for about 30 seconds in a planetary mixer with the volatility inhibiting solution and then adding finely powdered MAP. The mixture of volatility inhibitor wetted urea and MAP was then mixed for about 3 minutes to harden the surface and distribute the MAP powder over the granular urea surface.

EXAMPLE 15

A volatility reduced phosphate coated granular urea product with a composition of 37.6% N, 4.87% P and 0.22% B was prepared using granular urea, the volatility inhibiting ethanolamine borate of Example 1 (9.02% B), and finely powdered MAP. The phosphate coated urea product was composed of 75.4% granular urea, 2.4% of the volatility inhibiting ethanolamine borate solution and 22.2% MAP.

The reduction in nitrogen release for the phosphate coated product prepared with the volatility inhibiting ethanolamine borate is shown in Table 6. Data are presented compared to uncoated urea run at the sample time.

EXAMPLE 16

Several phosphate coated urea materials were prepared from granular urea, the volatility inhibiting ethanol amine borate solution of Example 2 (6.22% B) and finely powdered MAP. The compositions prepared were:

A) A phosphate coated granular urea product with a composition of 38.9% N, 3.85% P and 0.13% B. The product was composed of 80.4% granular urea, 2.0% of the volatility inhibiting ethanolamine borate solution of Example 2 and 17,6% of powdered MAP.

B) A phosphate coated granular urea product with a composition of 37.0% N, 4.84% P and 0.15% B. The product was composed of 75.5% granular urea, 2.3% of the volatility inhibiting ethanolamine borate solution of Example 2 and 22.2% of powdered MAP.

C) A phosphate coated granular urea product with a composition of 35.4% N, 5.72% P and 0.17% B. The product was composed of 71.0% granular urea, 2.8% of the volatility inhibiting ethanolamine borate solution of Example 2 and 26.2% of powdered MAP.

The nitrogen release for the coated products of Example 16A–16C as a function of time are shown in FIG. 1. The volatility reduction compared to urea for these products is included in Table 6.

EXAMPLE 17

A volatility reduced phosphate coated urea product with a composition of 37.0% N, 4.84% P and 0.15% B of was prepared from granular urea, the volatility inhibiting triethanolamine borate solution of example 3 (6.22% B) and finely powdered MAP. The product was composed of 75.3% granular urea, 2.5% of the volatility inhibiting triethanolamine borate solution and 22.2% of powdered MAP. The reduction in nitrogen release for the coated product prepared with the volatility inhibiting triethanolamine borate of Example 17 compared to urea is shown in Table 6.

TABLE 6

Reduction in Volatile Nitrogen Losses Compared to Urea
for Phosphate Coated Urea Products Prepared from Urea,
MEA Borate or TEA Borate and MAP at 28° C.
on a Soil with a pH of 4.9 When Applied at 180 lb N/acre

| Example | Binder | Product Composition | | | Percent of Product N Due to | | Soil Moisture % | Reduction in Cumulative Nitrogen Loss Compared to Urea at | | | |
|---|---|---|---|---|---|---|---|---|---|---|---|
| | | % B | % P | % N | Urea-N | MAP-N | | 0.5 days | 1.0 days | 1.5 days | 2.0 days |
| 15 | 2.46% MEA Borate(9.02% B) | 0.22 | 4.87 | 37.6 | 94 | 6 | 15.3 | 99% | 98% | 75% | 51% |
| 17 | 2.49% TEA Borate(6.22% B) | 0.17 | 4.84 | 37.0 | 94 | 6 | 15.5 | 100% | 92% | 57% | 37% |
| 16A | 2.03% MEA Borate(6.22% B) | 0.13 | 3.85 | 38.9 | 96 | 4 | 15.5 | 100% | 87% | 50% | 35% |
| 16B | 2.34% MEA Borate(6.22% B) | 0.15 | 4.84 | 37.0 | 94 | 6 | 15.5 | 99% | 94% | 61% | 42% |
| 16C | 2.76% MEA Borate(6.22% B) | 0.17 | 5.72 | 35.40 | 93 | 7 | 15.3 | 99% | 98% | 80% | 55% |

Abbreviations - Ethanolamine (MEA), Triethanolamine (TEA), Monoammonium Phosphate (MAP)
MAP used contained 10.0% N, 21.8% P and a 5% (w/v) solution had a pH of 3.6

Compositions of the products of Examples 15–17 are shown in Table C.

TABLE C

Composition of Phosphate Coated Products
Prepared from Amino Alcohol Borates

| | Example | | | | |
|---|---|---|---|---|---|
| | 15 | 16A | 16B | 16C | 17 |
| Binding Agent | MEA Borate (9.02% B) | MEA Borate (6.22% B) | MEA Borate (6.22% B) | MEA Borate (6.22% B) | TEA Borate (6.22% B) |
| Amino Alcohol | MEA | MEA | MEA | MEA | TEA |
| % Urea | 75.4 | 80.4 | 75.5 | 71.0 | 75.3 |
| % Binding Agent | 2.4 | 2.0 | 2.3 | 2.8 | 2.5 |
| % MAP | 22.2 | 17.6 | 22.2 | 26.2 | 22.2 |
| Powder/Binding Agent Ratio | 9:25:1 | 8.80:1 | 9.65:1 | 9.36:1 | 8.88:1 |
| Water (%) | 0.73 | 1.04 | 1.20 | 1.46 | 0.11 |
| Non Aqueous Substances (%) | 99.27 | 98.96 | 98.80 | 98.54 | 99.89 |
| Amino Alcohol (%) | 0.43 | 0.25 | 0.29 | 0.35 | 1.10 |
| % Boron Compounds | 1.24 | 0.71 | 0.82 | 1.00 | 1.29 |
| Total N (%) Note A | 37.0 | 38.8 | 37.0 | 35.4 | 37.0 |
| Urea N (%) | 34.7 | 37.0 | 34.7 | 32.7 | 34.6 |

TABLE C-continued

Composition of Phosphate Coated Products
Prepared from Amino Alcohol Borates

|  | Example | | | | |
|---|---|---|---|---|---|
|  | 15 | 16A | 16B | 16C | 17 |
| MAP N (%) | 2.2 | 1.8 | 2.2 | 2.6 | 2.2 |
| Phosphorus (%) | 4.84 | 3.84 | 4.84 | 5.71 | 4.84 |
| Boron (%) | 0.22 | 0.12 | 0.14 | 0.17 | 0.16 |

Abbreviations: Ethanolamine (MEA); Triethanolamine (TEA); Monoammonium phosphate (MAP) - The MAP used contained 10.0% N, 21.8% P and a 5% (w/v) solution had a pH of 3.6.

Note ATotal nitrogen represents sum of urea nitrogen, nitrogen in amino alcohol used in preparing product and nitrogen in MAP.

EXAMPLE 18

Phosphate coated urea products were prepared from granular urea, the volatility inhibiting borate solution containing complex ions of copper (II) with ethanolamine of Example 4 containing 6.22% B and 1.00% Cu, and finely powdered MAP. The MAP powder contained 10.0% N, 21.8% P, and a 5% (w/v) solution had a pH of 3.6. The following compositions were prepared:

A) A phosphate coated urea with a composition of 38.9% N, 3.85% P, 0.11% B and, 0.018% Cu. The product was composed of 80.5% urea, 1.8% of the volatility inhibitor solution, and 17.7% MAP.

B) A phosphate coated urea with a composition of 37.0% N, 4.84% P, 0.15% B, and 0.024% Cu. The product was composed of 75.5% urea, 2.3% of the volatility inhibitor solution, and 22.2% MAP.

C) A phosphate coated urea with a composition of 35.4% N, 5.72% P, 0.17% B, and 0.028% Cu. The product was composed of 71.1% urea, 2.7% of the volatility inhibitor solution, and 26.2% MAP.

The nitrogen release data for the coated products of Examples 18A–18C is shown in FIG. 2 on a soil with a pH of 4 and in FIG. 3 on a soil with a pH of 4.9. The reduction in nitrogen release compared to urea for coated product of Example 18A on soils of varying pH is shown in Table 7.

EXAMPLE 19

A phosphate coated urea product was prepared from granular urea, the volatility inhibiting borate solution containing complex ions of copper (II) with ethanolamine of Example 5 containing 6.22% B and 2.31% Cu, and finely powdered MAP (same as Example 18). The product was composed of 75.5% urea, 2.3% of the volatility inhibitor solution, and 22.2% MAP. The final product had a composition of 37.0% N, 4.84% P, 0.15% B and 0.054% Cu. The nitrogen release for the coated product of Example 19 is shown in Table 7.

EXAMPLE 20

A phosphate coated urea product was prepared from granular urea, the volatility inhibiting borate complex ion of copper (II) with ethanolamine of Example 6 containing 5.35% B and 4.60% Cu, and finely powdered MAP (same as Example 18). The product was composed of 75.5% urea, 2.3% of the volatility inhibitor solution, and 22.2% MAP. The final product had a composition of 37.0% N, 4.84% P, 0.13% B and 0.11% Cu. The nitrogen release for the coated product of Example 20 is shown in Table 7.

TABLE 7

Reduction in Nitrogen Release on Soils of Varying pH for
Phosphate Coated Urea Products Prepared from Borate
Solutions Containing Complex Ions of Copper (II)
with Ethanolamine Containing Different Amounts of
Boron and Copper Compared to Urea
at 28° C. when Applied at 180 lb N/acre

| Soil Conditions | | Reduction in Cumulative Nitrogen Release Compared to Urea at | | | |
|---|---|---|---|---|---|
| pH | Moisture (%) | 0.5 days | 1.0 days | 1.5 days | 2.0 days |
| Example 18A | | | | | |
| 38.9% N, 3.85% P, 0.13% B, 0.018% Cu | | | | | |
| Product made with borate solution containing complex ions of | | | | | |
| CU (II) with ethanolamine at 6.22% B, 1.00% Cu | | | | | |
| 7.2 | 15.6 | 88% | 40% | 18% | 15% |
| 4.9 | 15.0 | 99% | 74% | 40% | 30% |
| Example 19 | | | | | |
| 37.0% N, 4.84% P, 0.15% B, 0.054% Cu | | | | | |
| Product made with borate solution containing complex ions of | | | | | |
| CU (II) with ethanolamine at 6.22% B and 2.30% Cu | | | | | |
| 7.2 | 15.7% | 97% | 93% | 65% | 55% |
| 4.9 | 15.0% | 96% | 92% | 79% | 69% |
| Example 20 | | | | | |
| 37.0% N, 4.84% P, 0.13% B, 0.11% Cu | | | | | |
| Product made borate solution containing complex ions of | | | | | |
| CU (II) with ethanolamine at 5.35% B and 4.60% Cu | | | | | |
| 7.2 | 15.3% | 98% | 87% | 74% | 67% |
| 4.9 | 15.7 | 97% | 95% | 77% | 66% |

TABLE D

Composition of Phosphate Coated Urea Products
Prepared from Urea, Borate Solutions Containing
Complex Ions of Copper (II) with Ethanolamine and MAP

| | Example | | | | |
|---|---|---|---|---|---|
| | 18A | 18B | 18C | 19 | 20 |
| % B, % Cu in Binding Agent | 6.22% B, 1.00% Cu | 6.22% B, 1.00% Cu | 6.22% B, 1.00% Cu | 6.22% B, 2.31% Cu | 5.35% B, 4.60% Cu |
| Copper Source | $CuSO_4 \cdot 5H_2O$ | $CuSO_4 \cdot 5H_2O$ | $CuSO_4 \cdot 5H_2O$ | $CuSO_4 \cdot 5H_2O$ | $CuCl_2 \cdot 2H_2O$ |
| Urea (%) | 80.5 | 75.5 | 71.1 | 75.5 | 75.5 |
| Binding Agent (%) | 1.8 | 2.3 | 2.7 | 2.3 | 2.3 |
| MAP (%) | 17.7 | 22.2 | 26.2 | 22.2 | 22.2 |
| Powder: Binding Agent Ratio | 9.83:1 | 9.65:1 | 9.70:1 | 9.65:1 | 9.65:1 |
| Water (%)[Note A] | 0.67 | 0.86 | 1.01 | 0.86 | 0.66 |
| Non Aqueous Substances (%) | 99.33 | 99.14 | 98.99 | 99.14 | 99.34 |
| Ethanolamine (%) | 0.22 | 0.29 | 0.34 | 0.29 | 0.62 |
| Boron Compounds (%) | 0.64 | 0.82 | 0.96 | 0.82 | 0.73 |
| Ethylene Glycol (%) | 0.19 | 0.24 | 0.29 | 0.13 | 0.00 |
| Total N (%)[Note B] | 38.8 | 37.0 | 35.4 | 37.0 | 37.1 |
| Urea N (%) | 37.0 | 34.7 | 32.7 | 34.7 | 34.7 |
| MAP N (%) | 1.8 | 2.2 | 2.6 | 2.2 | 2.2 |
| Phosphorus (%) | 3.86 | 4.84 | 5.71 | 4.84 | 4.84 |
| Boron (%) | 0.11 | 0.14 | 0.17 | 0.14 | 0.12 |
| Copper (%) | 0.018 | 0.023 | 0.027 | 0.053 | 0.11 |

Abbreviations and Notes:
Monoammonium phosphate (MAP) - The MAP used contained 10.0% N, 21.8% P and a 5% (w/v) solution had a pH of 3.6;
[Note A] Does not include waters of hydration in metal salt.
[Note B] Total nitrogen represents sum of urea nitrogen, nitrogen in binding agent used and nitrogen in MAP contained in the product

EXAMPLE 21

Volatility reduced phosphate coated urea products were prepared from granular urea, the volatility inhibiting borate solution additionally containing complex ions of zinc with ethanolamine of Example 7 containing 6.22% B and 1.00% Zn, and finely powdered MAP (same as Example 18). The following compositions were prepared:

A) A phosphate coated urea with a composition of 38.8% N, 3.86% P, 0.13% B, and 0.023% Zn. The product was composed of 80.3% urea, 2.1% of the volatility inhibitor solution, and 17.6% MAP.

B) A phosphate coated urea with a composition of 37.0% N, 4.84% P, 0.15% B, and 0.025% Zn. The product was composed of 75.5% urea, 2.34% of the volatility inhibitor solution, and 22.2% MAP.

C) A phosphate coated urea with a composition of 35.4% N, 5.72% P, 0.17% B, and 0.029% Zn. The product was composed of 71.1% urea, 2.7% of the volatility inhibitor solution, and 26.2% MAP.

The nitrogen release for the coated products of Examples 21A–21C are shown in FIG. 4 on a soil with a pH of 4. The reduction in nitrogen release for the coated products of Examples 21A–21C is shown in Table 8. Data for Examples 18A–18C are included for comparison.

TABLE 8

Reduction in Nitrogen Loss for Phosphate
Coated Urea Prepared from Urea and MAP
using a Borate Solution Containing Complex
Ions of Zinc or Copper (II) with Ethanolamine
Nitrogen Loss is Expressed Relative to Urea and was
Measured at 28° C. on a Soil with
a pH of 4.9 and a Moisture Content of 14.7%
when at 180 lb N/acre Phosphate Coated Products of Examples 21A–21C
Using Borate Solution Containing
Complex Ions of Zinc with Ethanolamine

| Product Composition % | | | | Percent of Total Nitrogen from | | Reduction in Cumulative Nitrogen Loss Compared to Urea at | | | |
|---|---|---|---|---|---|---|---|---|---|
| P | B | Zn | N | Urea | MAP | 0.5 days | 1.0 days | 1.5 days | 2.0 days |
| 3.86 | 0.13 | 0.023 | 38.8 | 95 | 5 | 96% | 61% | 38% | 33% |
| 4.84 | 0.15 | 0.025 | 37.0 | 94 | 6 | 98% | 81% | 56% | 45% |
| 5.72 | 0.17 | 0.029 | 35.4 | 93 | 7 | 99% | 86% | 70% | 61% |

TABLE 8-continued

Reduction in Nitrogen Loss for Phosphate
Coated Urea Prepared from Urea and MAP
using a Borate Solution Containing Complex
Ions of Zinc or Copper (II) with Ethanolamine
Nitrogen Loss is Expressed Relative to Urea and was
Measured at 28° C. on a Soil with
a pH of 4.9 and a Moisture Content of 14.7%
when at 180 lb N/acre Phosphate Coated Products of Examples 18A–18C
Using Borate Solution Containing/
Complex Ions of Copper (II) with Ethanolamine

| Product Composition % | | | | Percent of Total Nitrogen from | | Reduction in Cumulative Nitrogen Loss Compared to Urea at | | | |
|---|---|---|---|---|---|---|---|---|---|
| P | B | Cu | N | Urea | MAP | 0.5 days | 1.0 days | 1.5 days | 2.0 days |
| 3.85 | 0.11 | 0.018 | 38.9 | 95 | 5 | 99% | 67% | 34% | 28% |
| 4.84 | 0.15 | 0.024 | 37.0 | 94 | 6 | 99% | 72% | 42% | 32% |
| 5.72 | 0.17 | 0.028 | 35.4 | 93 | 7 | 100% | 92% | 65% | 48% |

Example 21A - 3.86% P; Example 21B - 4.84% P; Example 21C - 5.72% P
Example 18A - 3.85% P; Example 18B - 4.84% P; Example 18C - 5.72% P
MAP - Monoammonium phosphate –10.0% N. 21, 8% P, 5% (w/v) solution pH 3.61

Compositions of the products of Example 21 are shown in Table E.

TABLE E

Composition of Phosphate Coated Urea Products
Prepared from Borate Solutions Containing
Complex Ions of Zinc with Ethanolamine and MAP

| | Example | | |
|---|---|---|---|
| | 21A | 21B | 21C |
| Binding Agent % B, % Zn | 6.22% B, 1.00% Zn | 6.22% B, 1.00% Zn | 6.22% B, 1.00% Zn |
| Zinc Source[A] | ZnSO$_4$(35% Zn) | ZnSO$_4$(35% Zn) | ZnSO$_4$(35% Zn) |
| Urea (%) | 80.3 | 75.5 | 71.1 |
| Binding Agent (%) | 2.1 | 2.3 | 2.7 |
| MAP (%) | 17.6 | 22.2 | 26.2 |
| Powder: Binding Agent Ratio | 8.38:1 | 9.65:1 | 9.70:1 |
| Water (%)[B] | 1.03 | 1.13 | 1.32 |
| Non Aqueous Substances (%) | 98.97 | 98.87 | 98.68 |
| Ethanolamine (%) | 0.26 | 0.29 | 0.34 |
| Boron Compounds (%) | 0.75 | 0.82 | 0.96 |
| Ethylene Glycol (%) | 0 | 0 | 0 |
| Total N (%)[C] | 38.8 | 37.0 | 35.4 |
| Urea N (%) | 36.9 | 34.7 | 32.7 |
| MAP N (%) | 1.8 | 2.2 | 2.6 |
| Phosphorus (%) | 3.84 | 4.84 | 5.71 |
| Boron (%) | 0.13 | 0.14 | 0.17 |
| Zinc (%) | 0.021 | 0.023 | 0.027 |

Abbreviations: Monoammonium phosphate (MAP) - The MAP used contained 10.0% N, 21.8% P and a 5% (w/v) solution had a pH of 3.6
[A] Zinc Sulfate contains 1–2 moles of water; % Zn given for this substance.
[B] Does not include waters of hydration in zinc sulfate.
[C] Total nitrogen represents sum of urea nitrogen, nitrogen in binding agent used and nitrogen in MAP contained in the product.

EXAMPLE 22

Phosphate coated urea products were prepared from granular urea, the volatility inhibiting solution borate solution containing complex ions of copper (II) with ethanolamine of Example 4 containing 6.22% B and 1.00% Cu, and powdered MAP. The finely powdered MAP used was from a different commercial supplier than that of Examples 18–21 and had a composition of 11.0% N, and 22.7% P and the pH of a 5% (w/v) solution of this MAP was 5.7. The following compositions were prepared:

A) A phosphate coated urea with a composition of 39.1% N, 3.90% P, 0.13% B, and 0.021% Cu. The product was composed of 80.7% urea, 2.1% of the volatility inhibitor solution, and 17.2% MAP.

B) A phosphate coated urea with a composition of 37.4% N, 4.89% P, 0.15% B, and 0.025% Cu. The product was composed of 76.1% urea, 2.4% of the volatility inhibitor solution, and 21.5% MAP.

C) A phosphate coated urea with a composition of 35.9% N, 5.76% P, 0.17% B, and 0.027% Cu. The product was composed of 71.9% urea, 2.6% of the volatility inhibitor solution, and 25.5% MAP.

The reduction in nitrogen release for the coated products of Examples 22A–22C is shown in Table 9. The reduction in nitrogen release for products of Examples 22A–22C decreases with increasing phosphate content implying that the absolute nitrogen release increases as phosphorus content increases.

TABLE 9

Reduction in Nitrogen Release for Phosphate Coated Urea Products of Example 22A–22C Prepared with MAP using a Borate Solution Containing Complex Ions of Cu (II) with Ethanolamine at 6.22% B and 1.00% Cu The MAP used was from a Different Source than that used in Example 15–21 Volatility Tests Were Run at 28° C. on Soil with a pH of 5.0 having a Moisture Content of 14.1% with Nitrogen (total) Applied at Rate of 180 lb/acre

| Product Composition (%) | | | | Percent of Total Nitrogen from | | Reduction in Cumulative Nitrogen Release Compared to Urea at | | | |
|---|---|---|---|---|---|---|---|---|---|
| P | B | Cu | N | Urea | MAP | 0.5 days | 1.0 days | 1.5 days | 2.0 days |
| 3.90 | 0.13 | 0.021 | 39.1 | 94.9 | 5.1 | 94% | 57% | 37% | 32% |
| 4.89 | 0.15 | 0.025 | 37.4 | 93.7 | 6.3 | 92% | 43% | 29% | 25% |
| 5.76 | 0.17 | 0.027 | 35.9 | 92.8 | 7.2 | 96% | 28% | 12% | 8.9% |

Example 22A - 3.90% P; Example 22B - 4.89% P; Example 22C - 5.76% P
The MAP Powder Had a pH of 5.7 when 5 g was dissolved in 100 mL of water Compositions of the products of Example 22 are shown in Table F.

TABLE F

Composition of Phosphate Coated Urea Products Prepared from Borate Solutions Containing Complex Ions of Copper (II) with Ethanolamine and MAP The MAP used was from a Different Source than that used In Example 15–21

| | Example | | |
|---|---|---|---|
| | 22A | 22B | 22C |
| Binding Agent % B, % Cu | 6.22% B, 1.00% Cu | 6.22% B, 1.00% Cu | 6.22% B, 1.00% Cu |
| Copper Source | $CuSO_4 \cdot 5H_2O$ | $CuSO_4 \cdot 5H_2O$ | $CuSO_4 \cdot 5H_2O$ |
| Urea (%) | 80.7 | 76.1 | 71.9 |
| Binding Agent (%) | 2.1 | 2.4 | 2.6 |
| MAP (%) | 17.2 | 21.5 | 25.5 |
| Powder: Binding Agent Ratio | 8.19:1 | 8.96:1 | 9.81:1 |
| Water (%)[Note A] | 0.79 | 0.90 | 0.97 |
| Non Aqueous Substances (%) | 99.21 | 99.10 | 99.03 |
| Ethanolamine (%) | 0.26 | 0.30 | 0.32 |
| Boron Compounds (%) | 0.75 | 0.85 | 0.93 |
| Ethylene Glycol (%) | 0.22 | 0.25 | 0.28 |
| Total N (%)[Note B] | 39.1 | 37.4 | 36.0 |
| Urea N (%) | 37.1 | 35.0 | 33.1 |
| MAP N (%) | 1.9 | 2.4 | 2.8 |
| Phosphorus (%) | 3.90 | 4.88 | 5.90 |
| Boron (%) | 0.13 | 0.15 | 0.16 |
| Copper (%) | 0.021 | 0.024 | 0.026 |

Abbreviations: Monoammonium phosphate (MAP) - The MAP used contained 11.0% N, 22.7% P and a 5% (w/v) solution had a pH of 5.7
[Note A]Does not include waters of hydration in zinc sulfate.
[Note B]Total nitrogen represents sum of urea nitrogen, nitrogen in binding agent used, and nitrogen in MAP.

Nitrogen losses generally decrease as phosphorus content of the coated products increases if the MAP powder used has a low pH when dissolved in water. This trend was observed for all Examples from 15–21 where the MAP powder used had a pH of 3.6 in a 5% (w/v) aqueous solution and can be seen in FIGS. 1 through 4. When nitrogen losses decrease, the percent reduction in nitrogen loss is greater. The data in Table 8 indicate that as phosphorus content of the coated product increases greater reduction in nitrogen losses are observed when the powdered MAP used to prepare the product has a low pH when dissolved in water.

The data in Table 9 indicate that for the powdered MAP used in Examples 22A–22C that the reduction in nitrogen losses decrease as phosphorus content in the coated product increases. The powdered MAP used in Examples 22A–22C had a pH of 5.7 when dissolved in water (5% w/v). The higher pH of this powdered MAP when dissolved in water indicates the presence of basic phosphates such as DAP (diammonium phosphate). The more alkaline basic phosphates reduce the buffering ability of the phosphate coatings allowing ammonia to be more easily released.

EXAMPLE 23

A phosphate coated urea products were prepared from granular urea, the volatility inhibiting borate solution containing complex ions of copper (11) with ethanolamine of Example 4 containing 6.22% B and 1.00% Cu, and powdered potassium dihydrogen phosphate which had been dried at 105° C. prior to grinding. The products produced were:

A) A phosphate coated urea with a composition of 37.6% N, 3.75% P, 3.93% K, 0.14% B, and 0.021% Cu was prepared. The product was composed of 81.5% urea, 2.0% of the volatility inhibitor solution, and 16.5% potassium dihydrogen phosphate.

B) A phosphate coated urea with a composition of 35.5% N, 4.73% P, 5.97% K, 0.14% B, and 0.022% Cu was prepared. The product was composed of 77.0% urea, 2.2% of the volatility inhibitor solution, and 20.8% potassium dihydrogen phosphate. The reduction in nitrogen release for the potassium phosphate coated urea products of Example 23A and 23B are shown in Table 10.

TABLE 10

Reduction in Nitrogen Release Phosphate Coated Urea
Products Prepared with Potassium Dihydrogen Phosphate
and a Borate Solution Containing Complex Ions of Cu (II) with
Ethanolamine at 6.22% B and 1.00% Cu
Compared to Urea at 28° C. When Applied at 180 lb N/acre

| Soil | | Reduction in Cumulative Nitrogen Release Compared to Urea at | | | |
|---|---|---|---|---|---|
| pH | Moisture (%) | 0.5 days | 1.0 days | 1.5 days | 2.0 days |
| Example 23A | | | | | |
| 37.6% N, 3.75% P, 3.93% K, 0.14% B, 0.021% Cu | | | | | |
| 4.9 | 15.6 | 94% | 42% | 18% | 15% |
| Example 23B | | | | | |
| 35.5% N, 4.73% P, 5.97% K, 0.14% B, 0.022% Cu | | | | | |
| 5.0 | 15.1 | 93% | 46% | 24% | 20% |

Compositions of the products of Example 23 are shown in Table G.

TABLE G

Composition of Phosphate Coated Urea Products
Prepared from Borate Solutions Containing
Complex Ions of Copper (II) with Ethanolamine
and Potassium Dihydrogen Phosphate

| | Example | |
|---|---|---|
| | 23A | 23B |
| Binding Agent % B, % Cu | 6.22% B, 1.00% Cu | 6.22% B, 1.00% Cu |
| Copper Source in Binding Agent | $CuSO_4 \cdot 5H_2O$ | $CuSO_4 \cdot 5H_2O$ |
| Phosphate Source for Product | $KH_2PO_4$ | $KH_2PO_4$ |
| Urea (%) | 81.5 | 77.0 |
| Binding Agent (%) | 2.0 | 2.2 |
| Potassium Dihydrogen Phosphate (%) | 16.5 | 20.8 |
| Powder: Binding Agent Ratio | 8.25:1 | 9.46:1 |
| Water (%)$^{Note\ A}$ | 0.75 | 0.82 |
| Non Aqueous Substances (%) | 99.25 | 99.18 |
| Ethanolamine (%) | 0.25 | 0.27 |
| Boron Compounds (%) | 0.71 | 0.78 |
| Ethylene Glycol (%) | 0.21 | 0.23 |
| Total N (%)$^{Note\ B}$ | 37.5 | 35.5 |
| Urea N (%) | 37.5 | 35.4 |
| Phosphorus (%) | 3.76 | 4.73 |
| Potassium (%) | 4.74 | 6.00 |
| Boron (%) | 0.12 | 0.14 |
| Copper (%) | 0.020 | 0.022 |

$^{Note\ A}$Does not include waters of hydration in copper sulfate;
$^{Note\ B}$Total Nitrogen represents sum of urea nitrogen and nitrogen contained in the binding agent.

The following examples were prepared by mixing granular urea with one or more dry finely powdered nutrient supplying substances prior to adding the volatility inhibiting binder. Layering of the powders onto the urea granules was accomplished by spraying the volatility inhibiting solution onto the mixing bed of particles to agglomerate the mixture of particles. A planetary mixer was used for mixing in all examples and spraying of the volatility inhibiting binder was accomplished with a hand held sprayer. The mass difference for the spraying container was used to determine the quantity of volatility inhibiting binder used to prepare the product. After all binder was added, mixing continued until all of the dry powder(s) initially present were no longer present in the mixing vessel and the until surface had hardened. The total mixing times were about 5 minutes.

The volatility inhibiting borate solution containing complex ions of copper (II) with ethanolamine of Example 4 at 6.22% B and 1.00% Cu was used for Examples 24–28.

The percentage of the element supplied by powdered nutrient is indicated in parenthesis following the identity of the compound. Some of the finely powdered nutrients used in the following examples occur as hydrated compounds. The number of waters of hydration will be stated when known. The MAP used for Examples 24–28 contained 10.0% N, 21.8% P and a 5% (w/v) solution had a pH of 3.6.

EXAMPLE 24

A volatility reduced coated urea product containing phosphorus and added micronutrients with a composition of 36.3% N, 4.76% P, 0.14% B, 0.12% Cu, 0.24% Mn, 0.24% Zn was prepared from urea, the volatility inhibiting solution of Example 4, and finely powdered MAP, copper (II) sulfate pentahydrate (25.4% Cu), manganese sulfate (32% Mn) and zinc sulfate (35% Zn). The product was composed of 74.1% urea, 2.3% volatility inhibitor solution, 21.8% MAP, 0.4% copper (II) sulfate pentahydrate, 0.7% manganese (11) sulfate and 0.7% zinc sulfate. The volatility reduction data for the product of Example 24 on soils with varying pH data is shown in Table 11 below.

EXAMPLE 25

Volatility reduced urea products without phosphate were prepared using granular urea, the volatility inhibiting solution of Example 4, and either potassium sulfate or gypsum (calcium sulfate dihydrate). The following compositions were made:

A) A coated urea product with a composition of 37.4% N, 5.83% K, 3.05% S, 0.12% B, 0.020% Cu composed of 81.1% urea, 2.0% volatility inhibitor solution, and 16.9% powdered potassium sulfate.

B) A coated urea product with a composition of 36.4% N, 4.14% Ca, 4.89% S, 0.13% B and 0.022% Cu composed of 79.0% urea, 2.2% volatility inhibitor solution and 18.8% powdered gypsum.

The volatility reduction data are shown for the products of Examples 25A and 25B are shown in Table 12 below.

TABLE 11

Reduction in Nitrogen Release Compared to Urea
at 28° C. on Soils of Varying pH for Phosphate
Coated Urea Products and Additional Micronutrients
(Cu, Mn, Zn) when Applied at 180 lb N/acre
Binder for Coating was Volatility Inhibitor Borate Solution
Containing Complex Ions of Cu (II) with Ethanolamine
from Example 4 (6.22% B and 1.00% Cu)
Example 24
36.3% N, 4.76% P, 0.14% B, 0.12% Cu, 0.24% Mn, 0.24% Zn
94% of Nitrogen in Product is from Urea

| Soil Conditions | | Reduction in Cumulative Nitrogen Release Compared to Urea at | | | |
|---|---|---|---|---|---|
| pH | Moisture (%) | 0.5 days | 1.0 days | 1.5 days | 2.0 days |
| 7.2 | 15.6 | 97% | 93% | 62% | 52% |
| 4.9 | 15.0 | 96% | 92% | 79% | 69% |

Compositions of the products of Examples 24 and 25 are shown in Table H.

TABLE H

Composition of Coated Urea Products Produced with Borate Solution Containing Complex Ions of Copper (II) with Ethanolamine (6.22% B, 1.00% Cu) and Additional Macronutrient and Micronutrient Powders

| | Example | | |
|---|---|---|---|
| | 24 | 25A | 25B |
| Urea (%) | 74.1 | 81.1 | 79.0 |
| Binding Agent (%) | 2.3 | 2.0 | 2.2 |
| Additional Nutrient Powders (%) | | | |
| MAP | 21.8 | | |
| $CaSO_4 \cdot 2H_2O$ | | | 18.8 |
| $CuSO_4 \cdot 5H_2O$ | 0.40 | | |
| $K_2SO_4$ | | 16.9 | |
| $MnSO_4 \cdot H_2O$ | 0.70 | | |
| $ZnSO_4$ (35% Zn)[Note A] | 0.70 | | |
| Powder: Binding Agent Ratio | 10.26:1 | 8.45:1 | 8.54:1 |
| % Water[Note B] | 0.86 | 0.75 | 0.82 |
| % Non Aqueous Substances | 99.14 | 99.25 | 99.08 |
| % Ethanolamine | 0.29 | 0.25 | 0.27 |
| % Ethylene Glycol | 0.24 | 0.21 | 0.23 |
| % Boron Compounds | 0.82 | 0.71 | 0.78 |
| Total N[Note C] | 36.3 | 37.4 | 36.4 |
| Urea N | 34.1 | 37.3 | 36.3 |
| MAP N | 2.18 | | |
| Phosphorus (%) | 4.75 | | |
| Potassium (%) | | 7.58 | |
| Calcium (%) | | | 4.38 |
| Sulfur (%) | 0.31 | 3.11 | 3.50 |
| Boron (%) | 0.14 | 0.12 | 0.14 |
| Total Copper (%) | 0.13 | 0.020 | 0.022 |
| Manganese (%) | 0.23 | | |
| Zinc (%) | 0.25 | | |

Abbreviations: Monoammonium phosphate (MAP); MAP 10.0% N, 21.8% P, 5% (w/v) solution pH 3.6.
[Note A] % Zn given - water(s) of hydration unknown.
[Note B] does not include waters of hydration in metal salts or powders used.
[Note C] Total N includes N from urea, binding agent, and powders used.

EXAMPLE 26

Volatility reduced coated urea products without phosphate were prepared from granular urea, the volatility inhibiting solution of Example 4, zinc sulfate (35% Zn), and potassium magnesium sulfate (KMAG—sulfate of potash and magnesia—langbeinite 18.3% K, 10.9% Mg, 23.0% S). The following compositions were prepared:

A) A product containing 34.8% N, 3.58% K, 2.13% Mg, 5.03% S, 1.0% Zn, 0.019% B and 0.018% Cu composed of 75.6% urea, 1.8% volatility inhibiting binder, 3.0% zinc sulfate, and 19.6% KMAG.

B) A product containing 29.5% N, 5.57% K, 3.31% Mg, 7.51% S, 1.0% Zn, 0.17% B and 0.028% Cu composed of 63.9% urea, 2.8% volatility inhibiting binder, 2.9% zinc sulfate and 30.4% KMAG.

C) A product containing 23.9% N, 7.52% K, 4.47% Mg, 10.0% S, 1.0% Zn, 0.27% B, 0.044% Cu composed of 51.7% urea, 4.3% volatility inhibiting binder, 2.8% zinc sulfate and 41.2% KMAG.

The nitrogen release for the coated products on a soil with a pH of 5 is shown in FIG. 5. The products of Examples 26B and 26C developed some clumps after standing indicating that some stickiness was present. Once the clumps were broken, the product remained free flowing. The compositions of Examples 26A–26C are shown in Table I.

TABLE I

Composition of Coated Urea Products Produced with Borate Solution Containing Complex Ions of Copper (II) with Ethanolamine (6.22% B, 1.00% Cu) and Powdered KMAG and Zinc Sulfate

| | Example | | |
|---|---|---|---|
| | 26A | 26B | 26C |
| Urea (%) | 75.6 | 63.9 | 51.7 |
| Binding Agent (%) | 1.8 | 2.8 | 4.3 |
| KMAG | 19.6 | 30.4 | 41.2 |
| $ZnSO_4$ (35% Zn)[Note A] | 3.0 | 2.9 | 2.8 |
| Powder:Binding Agent Ratio | 12.56:1 | 11.89:1 | 10.23:1 |
| % Water[Note B] | 0.67 | 1.05 | 1.61 |
| % Non Aqueous Substances | 99.33 | 98.95 | 99.39 |
| % Ethanolamine | 0.22 | 0.35 | 0.53 |
| % Ethylene Glycol | 0.19 | 0.30 | 0.46 |
| % Boron Compounds | 0.64 | 1.0 | 1.5 |
| Total N[Note C] | 34.8 | 29.5 | 23.9 |
| Urea N | 34.8 | 29.4 | 23.8 |
| Potassium (%) | 3.58 | 5.51 | 7.52 |
| Magnesium (%) | 2.13 | 3.30 | 4.47 |
| Sulfur (%) | 5.02 | 7.49 | 9.96 |
| Boron (%) | 0.12 | 0.17 | 0.27 |
| Copper (%) | 0.018 | 0.028 | 0.043 |
| Zinc (%) | 1.05 | 1.02 | 0.98 |

Abbreviation: KMAG - sulfate of potash and magnesia - langbeinite; 18.3% K, 10.9% Mg, 23.0% S.
[Note A] % Zn given - water(s) of hydration unknown.
[Note B] does not include waters of hydration in metal salts or powders used.
[Note C] Total N includes N from urea, binding agent, and powders used.

EXAMPLE 27

Volatility reduced coated urea products having phosphate, calcium and sulfur were prepared from granular urea, the volatility inhibiting solution of Example 4, finely powdered MAP, and finely powdered gypsum. The following compositions were prepared:

A) A product containing 34.9% N, 4.57% P, 1.10% Ca; 1.30% S, 0.18% B, 0.030% Cu composed of 71.1% urea, 3.0% volatility inhibiting solution, 20.9% MAP and 5.0% gypsum.

B) A product containing 28.8% N, 3.77% P, 4.4% Ca, 5.2% S, 0.26% B and 0.043% Cu composed of 58.6% urea, 4.2% volatility inhibiting binder, 17.3% MAP and 19.9% gypsum.

The volatility reduction data are shown for the products of Examples 27A and 27B are shown in Table 12 below.

EXAMPLE 28

Volatility reduced coated urea products containing phosphate from 2 sources were prepared were prepared from granular urea, the volatility inhibiting solution of Example 4, MAP, and triple super phosphate (TSP-13.0% Ca; 20.1% P). The compositions prepared were:

A) A product containing 36.3% N, 4.86% P, 0.799% Ca, 0.16% B, 0.020% Cu composed of 75.3% urea, 1.9% volatility inhibiting binder, 16.7% MAP and 6.1% TSP.

B) A product containing 36.6% N, 4.84% P, 0.380% Ca, 0.14% B, 0.022% Cu composed of 75.4% urea, 2.2% volatility inhibiting binder, 19.5% MAP and 2.9% TSP.

The reduction in nitrogen loss for the products of Examples 28A–28B are shown in Table 12 below. The product of Example 28A developed some dampness after preparation. The product remained flowable, but continued to display some dampness. An additional product prepared with a MAP/TSP ratio of 4:1 displayed much less dampness indicating that the upper limit for the MAP/TSP ratio is about 4:1 on a weight basis.

Tumble growth agglomeration equipment has been widely used in the fertilizer industry to prepare granular products. The equipment can be broadly classified as low shear mixers and high shear mixers. Low shear mixers essentially have a tumbling bed of particles onto which a binding agent can be sprayed. A common type uses a rotating drum to agitate the particle bed. High shear mixers mechanically fluidize the particles while the binding agent is sprayed into the particle mixture. High shear mixers are commonly employed by the pharmaceutical industry. A popular design uses a plow (series of plows) to mechanically fluidize the particle bed.

The following examples illustrate that the products of this invention can be produced in commercially known equipment. Both high shear and low shear mixers were tested.

TABLE 12

Volatility Reduction at 28° C. Compared to Urea for Various Coated Urea Compositions Prepared Using Volatility Inhibiting Borate Solution Containing Complex Ions of Cu (II) with Ethanolamine from Example 4 (6.22% B, 1.00% Cu) and the Finely Powdered Materials Indicated When Applied at a Rate of 180 lb N/ac to a Soil with a pH of 5.0

| Example | P | K | Ca | S | B | Cu | N | Percent Urea-N | Soil Moisture | Percent Reduction in Nitrogen Loss Compared to Urea | | | |
|---|---|---|---|---|---|---|---|---|---|---|---|---|---|
| | | | | | | | | | | 0.5 days | 1.0 days | 1.5 days | 2.0 days |
| Finely Powdered Sulfate Salts (Potassium Sulfate (25A) or Gypsum (25B)) | | | | | | | | | | | | | |
| 25A | 0 | 5.83 | 0 | 3.05 | 0.124 | 0.020 | 37.4 | 100 | 14.9% | 95% | 33% | 16% | 14% |
| 25B | 0 | 0 | 4.14 | 4.89 | 0.134 | 0.022 | 36.4 | 100 | 14.9% | 97% | 58% | 32% | 29% |
| Mixtures of Finely Powdered MAP and Gypsum | | | | | | | | | | | | | |
| 27A | 4.57 | 0 | 1.10 | 1.30 | 0.184 | 0.030 | 34.9 | 94 | 15.1% | 99% | 75% | 47% | 38% |
| 27B | 3.77 | 0 | 4.38 | 5.17 | 0.261 | 0.043 | 28.8 | 93 | 15.1% | 99% | 86% | 63% | 56% |
| Mixtures of Finely Powdered MAP and Triple Super Phosphate | | | | | | | | | | | | | |
| 28A | 4.86 | 0 | 0.799 | 0 | 0.157 | 0.020 | 36.3 | 95 | 14.7% | 98% | 71% | 49% | 43% |
| 28B | 4.84 | 0 | 0.380 | 0 | 0.137 | 0.022 | 36.6 | 95 | 14.7% | 97% | 71% | 41% | 33% |

Compositions of the products of Examples 27A and B, and 28A and B are shown in Table J.

TABLE J

Composition of Coated Urea Products Produced with Borate Solution Containing Complex Ions of Copper (II) with Ethanolamine (6.22% B, 1.00% Cu), MAP and Additional Macronutrient as Gypsum or Super Phosphate

| | Example | | | |
|---|---|---|---|---|
| | 27A | 27B | 28A | 28B |
| Urea (%) | 71.1 | 58.6 | 75.3 | 75.4 |
| Binding Agent (%) | 3.0 | 4.2 | 1.9 | 2.2 |
| MAP | 20.9 | 17.3 | 16.7 | 19.5 |
| $CaSO_4 \cdot 2H_2O$ | 5.0 | 19.9 | | |
| TSP | | | 6.1 | 2.9 |
| Powder:Binding Agent Ratio | 8.63:1 | 8.85:1 | 12.00:1 | 10.18:1 |
| MAP:TSP | | | 2.7:1 | 6.7:1 |
| % Water[Note A] | 1.12 | 1.57 | 0.71 | 0.82 |
| % Non Aqueous Substances | 98.88 | 98.43 | 99.29 | 99.18 |
| % Ethanolamine | 0.37 | 0.52 | 0.24 | 0.28 |
| % Ethylene Glycol | 0.32 | 0.46 | 0.20 | 0.23 |
| % Boron Compounds | 1.07 | 1.50 | 0.68 | 0.78 |
| Total N[Note B] | 34.9 | 28.8 | 36.4 | 36.7 |
| Urea N | 32.7 | 27.0 | 34.6 | 34.7 |
| MAP N | 2.1 | 1.7 | 1.7 | 1.9 |
| Phosphorus (%) | 4.56 | 3.77 | 4.87 | 4.83 |
| Calcium (%) | 1.16 | 4.63 | 0.79 | 0.38 |
| Sulfur (%) | 0.93 | 3.71 | | |
| Boron (%) | 0.19 | 0.26 | 0.12 | 0.14 |
| Copper (%) | 0.030 | 0.040 | 0.019 | 0.022 |

Abbreviations: Monoammonium phosphate (MAP); MAP 10.0% N, 21.8% P, 5% (w/v) solution pH 3.6; Triple super phosphate (TSP)
[Note A] does not include waters of hydration in metal salts or powders used.
[Note B] Total N includes N from urea, binding agent, and powders used.

EXAMPLE 29

A series of tests were conducted in a batch model high shear mixer (2 end plows and 1 center plow rotating at 155 rpm) with a total volume of 130 L. The mixer was charged with the dry powders (about 50% of the total volume was used) prior to starting the motors to mechanically fluidize the particle bed. After the plows had reached speed, the volatility inhibiting binder solution of Example 4 was sprayed into the fluidized particle bed from the top. The product was examined after all of the volatility inhibiting binder solution had been added and then continued until the grainy surface coating had disappeared. A total mixing time up to 6 minutes was required for some test runs. A number of compositions were prepared using granular urea:

A) 100 pounds of granular urea and 29.4 lb of finely powdered MAP (same as Examples 15–21) were placed into the mixing vessel and the 10HP motor driving the plows was started. 3.69 lbs of the volatility inhibiting binding solution of Example 4 were sprayed into the particle mixture. The binding solution was added over a 4.5 minute time period and the total mixing time was 6 minutes.

B) 100 pounds of granular urea, 29.4 lb of finely powdered MAP (same as examples 15–21), and 0.919 lb of finely powdered boric acid were placed into the mixing vessel and the 10HP motor driving the plows was started. 3.69 lbs of the volatility inhibiting binding solution of example 4 were sprayed into the particle mixture. The binding solution was added over a 1.5 minute time period and the total mixing time was 2.5 minutes.

All tests with the high shear batch mixing produced acceptable product.

EXAMPLE 30

A test with a low shear continuous rotary blender was made to evaluate possibility of producing product on a continuous basis. The mixing vessel was a rotating drum with a diameter of 16 inches and a length of 48 inches rotated at a speed of 12 rpm. Volumetric metering equipment (screw feeders) were calibrated and set to introduce 16 lbs per minute of urea and 3.6 lbs per minute of finely powdered MAP (same as Examples 15–21) into the mixer. The dry powders were introduced via the feed chute into the rotating mixer and the volatility inhibiting binder solution of Example 4 was sprayed onto the tumbling bed of particles at a rate of 0.40 lbs per minute. The test was run for 33 minutes and used 540 lbs of urea, 122 lbs of MAP and 1.35 gallons of volatility inhibiting binder. Acceptable product was obtained with a retention time of 1.5 minutes.

Tests with a low shear batch mixer, also, produced acceptable product.

Compositions of the products of Examples 29A and B, and 30 are shown in Table K.

TABLE K

Composition of Coated Urea Products Produced with Borate Solution Containing Complex Ions of Copper (II) with Ethanolamine (6.22% B, 1.00% Cu), MAP and Micronutrient Powders From Tests With Commercial Mixing Equipment

| | Example | | |
|---|---|---|---|
| | 29A | 29B | 30 |
| Mixing Action | Mechanically Fluidized Bed | Mechanically Fluidized Bed | Tumbling Bed |
| Mixer Speed | 155 rpm | 155 rpm | 12 rpm |
| Processing Mode | Batch | Batch | Continuous |
| Urea (%) | 75.1 | 74.6 | 79.9 |
| Binding Agent (%) | 2.8 | 2.8 | 2.1 |
| MAP | 22.1 | 21.9 | 18.0 |
| Boric Acid Powder | | | 0.7 |
| Powder:Binding Agent Ratio | 7.89:1 | 8.22:1 | 8.76:1 |
| % Water[Note A] | 1.05 | 1.03 | 0.77 |
| % Non Aqueous Substances | 98.95 | 98.97 | 99.23 |
| % Ethanolamine | 0.35 | 0.34 | 0.26 |
| % Ethylene Glycol | 0.30 | 0.29 | 0.22 |
| % Boron Compounds in Binder | 1.00 | 0.98 | 0.73 |
| Total N[Note B] | 36.8 | 36.6 | 38.6 |
| Urea N | 34.5 | 34.3 | 36.7 |
| MAP N | 2.2 | 2.2 | 1.8 |

TABLE K-continued

Composition of Coated Urea Products Produced with Borate Solution Containing Complex Ions of Copper (II) with Ethanolamine (6.22% B, 1.00% Cu), MAP and Micronutrient Powders From Tests With Commercial Mixing Equipment

| | Example | | |
|---|---|---|---|
| | 29A | 29B | 30 |
| Phosphorus (%) | 4.82 | 4.78 | 3.94 |
| Total Boron (%)[Note C] | 0.17 | 0.29 | 0.13 |
| Total Copper (%) | 0.028 | 0.028 | 0.021 |

Abbreviations: Monoammonium phosphate (MAP); MAP 10.0% N, 21.8% P, 5% (w/v) solution pH 3.6.
[Note A] does not include waters of hydration in metal salts or powders used.
[Note B] Total N includes N from urea, binding agent, and powders used.
[Note C] Includes boron in binder and boron in added powders.

EXAMPLE 31

Tests using the high shear batch mixer of Example 29 were conducted to determine if boron coated DAP product could be produced using the volatility inhibiting binder solution of Example 4. 100 lbs of granular DAP, and 2.5 lbs of finely powdered boric acid were placed into the batch high shear mixer and then 100 grams of the volatility inhibiting binder solution of Example 4 was sprayed onto the rotating particle bed. Dust (boric acid) was initially observed before binder addition was started and was not observed after 4 minutes of mixing.

EXAMPLE 32

A sample of ammonium sulfate coated urea was prepared from granular urea, ammonium sulfate, and zinc sulfate using an aqueous solution of the sorbitol borate complex as a binding agent. The binding agent solution was composed of 54.5% water, 34.1% sorbitol and 11.4% boric acid. The binding agent solution contained 2.00% boron. The sorbitol was dissolved in water and then the boric acid was added to form the sorbitol borate binding solution.

The coated urea product was prepared by mixing 311.20 grams of granular urea (76.2% of final product) with 7.85 grams of the binding solution (1.9% of final product) for 1 minute. A mixture containing 77.40 grams of ammonium sulfate (19.0% of final product) and 11.80 grams of zinc sulfate (2.90% of final product) was added to the binder wetted urea and mixing continued until all of the powder was absorbed onto the urea surface (approximately 2 minutes). The final product contained 39.1% N, 5.05% S, 1.01% Zn and 0.038% B.

Compositions of the products of Examples 31 and 32 are shown in Table L.

TABLE L

Composition Data for Boron Coated DAP and a Phosphate Coated Urea Products Prepared from a Solution of the Borate of Sorbitol and MAP

| | Example | |
|---|---|---|
| | 31 | 32 |
| Binding Agent | 6.22% B, 1.00% Cu-Borate [MEA Cu] (6.22% B, 1.00% Cu) | Sorbitol Borate Solution (2.00% B) |

TABLE L-continued

Composition Data for Boron Coated DAP and a Phosphate Coated
Urea Products Prepared from a Solution of the Borate of Sorbitol and MAP

| | Example | |
|---|---|---|
| | 31 | 32 |
| Phosphate Source | DAP | None |
| Nitrogen Source(s) | DAP | Urea, Ammonium Sulfate |
| Urea (%) | | 76.2 |
| Binding Agent (%) | 0.22 | 1.9 |
| Phosphate Source (%) | 97.35 | |
| Boric Acid (%) | 2.43 | |
| $ZnSO_4$ (35% Zn)$^{Note\ A}$ | | 2.9 |
| Ammonium Sulfate | | 19.0 |
| Powder: Binding Agent Ratio | 453:1 | 11.53:1 |
| Water (%)$^{Note\ B}$ | 0.08% | 1.03 |
| Non Aqueous Substances (%) | 99.92 | 98.97 |
| Ethanolamine (%) | 0.027 | |
| Sorbitol (%) | | 0.65 |
| Boron Compounds in Binder (%) | 0.078 | 0.038 |
| Ethylene Glycol (%) | 0.023 | |
| Total N (%)$^{Note\ C}$ | 44.8 | 39.1 |
| Urea N (%) | | 35.1 |
| DAP N (%) | 44.8 | |
| Ammonium Sulfate N (%) | | 4.0 |
| Phosphorus (%) | 19.5 | |
| Sulfur (%) | | 5.05% |
| Total Boron (%) | 0.439 | 0.038 |
| Copper (%) | 0.0022 | |
| Zinc | | 1.01% |

Abbreviations and Notes: Diammonium Phosphate (DAP) 18.0% N, 20.0% P; Monoammonium phosphate (MAP) 10.0% N, 21.8% P; 5% solution (w/v) pH 3.6.
$^{Note\ A}$% Zn given - water(s) of hydration unknown.
$^{Note\ B}$Does not include waters of hydration in copper sulfate pentahydrate;
$^{Note\ C}$Total N includes nitrogen from urea, binding agent, and powders used.
Note D: Borate [MEA Cu] refers to borate solution having complex ions of Cu (II) with ethanolamine (Example 4)

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A volatility-inhibited fertilizer comprised of granular urea coated with a coating including a binding agent having a boron anion and a hydrogen bonding group to adhere said binding agent to the granular urea, said binding agent being selected from the group consisting of amino alcohol borates and borates containing complex ions of divalent metals with amino alcohols.

2. The fertilizer of claim 1, wherein said amino alcohol is selected from the group consisting of ethanolamine, diethanolamine, triethanolamine, and mixtures thereof.

3. The fertilizer of claim 1, wherein said urea has an average particle size greater than 2 mm.

4. The fertilizer of claim 1, wherein said coating further includes at least one macronutrient.

5. The fertilizer of claim 1, wherein said coating further includes as least one micronutrient.

6. The fertilizer of claim 1, wherein said divalent metal is copper or zinc.

7. A process for making a volatility-inhibited fertilizer comprising coating granular urea with an aqueous solution of a binding agent having a boron anion and a hydrogen bonding group to adhere said binding agent to the granular urea, and removing excess moisture to form a free flowing fertilizer, said binding agent being selected from the group consisting of amino alcohol borates and borates containing complex ions of divalent metals with amino alcohols.

8. The process of claim 7, wherein said amino alcohol is selected from the group consisting of ethanolamine, diethanolamine, triethanolamine, and mixtures thereof.

9. The process of claim 7, wherein said urea has an average particle size greater than 2 mm.

10. The process of claim 7, wherein said coating further includes at least one macronutrient.

11. The process of claim 7, wherein said coating further includes as least one micronutrient.

12. The process of claim 7, wherein said divalent metal is copper or zinc.

13. A process for making a volatility-inhibited fertilizer comprising:

a) providing urea granules having an average particle size of at least 2 mm;

b) coating said granules with an aqueous solution of a borate of an amino alcohol selected from the group consisting of ethanolamine, diethanolamine, triethanolamine, and mixtures thereof; and c) removing excess moisture.

14. The process of claim 13, further including the step of preparing said borate by forming an aqueous solution of said amino alcohol and boric acid.

15. The process of claim 13, further including the step of coating said granules with additional plant nutrients.

16. The process of claim 15, wherein said additional plant nutrients are applied as particles having a mass distribution such that at least 90% of the particles will pass through a 100 mesh stand size sieve.

17. A process for making a volatility-inhibited fertilizer comprising:

a) providing urea granules having an average particle size of at least 2 mm;
b) coating said granules with an aqueous solution of a borate of an amino alcohol complex of a divalent metal; and
c) removing excess moisture.

18. The process of claim 17, wherein said amino alcohol is selected from the group consisting of ethanolamine, diethanolamine, triethanolamine, and mixtures thereof.

19. The process of claim 17, wherein said divalent metal is copper or zinc.

20. The process of claim 17, further including the step of preparing said borate by forming an aqueous solution of said amino alcohol, a water soluble divalent salt, and boric acid.

21. The process of claim 17, further including the step of coating said granules with additional plant nutrients.

22. The process of claim 17, wherein said additional plant nutrients are applied as particles having a mass distribution such that at least 90% of the particles will pass through a 100 mesh stand size sieve.

23. The process of claim 17, wherein said plant nutrients are selected from the group consisting of ammonium dihydrogen phosphate, potassium dihydrogen phosphate, potassium sulfate, potassium magnesium sulfate, calcium sulfate, sulfate salts of copper (II), iron, manganese (II), and zinc, boric acid, wettable sulfur, and mixtures thereof.

* * * * *